US009046880B2

(12) United States Patent
Orita

(10) Patent No.: US 9,046,880 B2
(45) Date of Patent: *Jun. 2, 2015

(54) CONTROL DEVICE OF POWER TRANSMISSION DEVICE AND METHOD OF SETTING PARAMETERS IN A POWER TRANSMISSION DEVICE

(71) Applicant: HONDA MOTOR CO., LTD., Tokyo (JP)

(72) Inventor: Atsuo Orita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 14/013,353

(22) Filed: Aug. 29, 2013

(65) Prior Publication Data

US 2014/0074293 A1 Mar. 13, 2014

(30) Foreign Application Priority Data

Sep. 7, 2012 (JP) ................................ 2012-197884

(51) Int. Cl.

*G05B 15/00* (2006.01)
*G05B 13/00* (2006.01)
*B25J 9/16* (2006.01)
*G05B 13/04* (2006.01)

(52) U.S. Cl.

CPC ............... *G05B 13/00* (2013.01); *Y10S 901/14* (2013.01); *B25J 9/1646* (2013.01); *G05B 13/04* (2013.01); *G05B 2219/41112* (2013.01); *G05B 2219/41251* (2013.01); *G05B 2219/41367* (2013.01); *G05B 2219/42352* (2013.01)

(58) Field of Classification Search

CPC ...... B25J 9/1633; B25J 9/1674; B25J 9/1638; G05B 19/425; G05B 2219/45014

See application file for complete search history.

(56) References Cited

U.S. PATENT DOCUMENTS

| | | | | |
|---|---|---|---|---|
| 2012/0199558 | A1* | 8/2012 | Faulkner | 218/143 |
| 2014/0072403 | A1* | 3/2014 | Orita | 415/9 |
| 2014/0074293 | A1* | 3/2014 | Orita | 700/261 |

FOREIGN PATENT DOCUMENTS

| | | |
|---|---|---|
| JP | 05-134758 | 6/1993 |

* cited by examiner

*Primary Examiner* — Ian Jen

(74) *Attorney, Agent, or Firm* — Rankin, Hill & Clark LLP

(57) ABSTRACT

A control input for controlling a driving force of an actuator (5), by a control processing of the sliding-mode control using a switching function configured from a first variable component, which is a deviation between an observed value of a secondary power imparted to a secondary element (3) from a primary element (2) via an elastic deformation member (4), and a second variable component which is a temporal change rate of the deviation, so as to converge the first variable component to zero on the switching hyperplane. A gradient of the switching hyperplane is preliminarily determined based on a response characteristics data satisfying a predetermined requirement.

16 Claims, 12 Drawing Sheets

13
τ _cmd
τ _cmd_c
13a
13b
LOW-PASS FILTER
13c
13d
τ _err
τ _act
13e
SLIDING-MODE CONTROL PROCESSING UNIT
13f
SECONDARY TORQUE DETECTING UNIT
τ m_cmd
θ in_act
θ out_act 13
τ_cmd
+
13a
+
τ_cmd_c
13b
LOW-PASS FILTER
+
13c
−
−
13d
+
τ_err_act
τ_act
13g
SLIDING-MODE CONTROL PROCESSING UNIT
OBSERVER
13h
13f
SECONDARY TORQUE DETECTING UNIT
τ m_cmd
θ in_act
θ out_act

CONTROL DEVICE OF POWER TRANSMISSION DEVICE AND METHOD OF SETTING PARAMETERS IN A POWER TRANSMISSION DEVICE

BACKGROUND OF THE INVENTION

1. Field of the Invention

The present invention relates to a control device of a power transmission device which drives a joint and the like of a robot.

2. Description of the Related Art

Conventionally, in an industrial robot and the like, a position control (a servo control) is generally performed, in order to drive a joint as a power transmission device between a primary element (a driving element) and a secondary element (a driven element). Further, as a control method for the position control, a technique which adopts a sliding-mode control, for example, in Japanese Patent Application Laid-Open No. H5-134758 (hereinafter referred to as Patent Document 1) is proposed. In this technique, a switching function used for the sliding-mode control is determined by a format of proportional integral control.

In the position control of the power transmission device such as the joint, the position of the secondary element (the driven element) may be controlled precisely to a desired position. However it lacks flexibility under various external environments in which a position or a shape of an external object contacting the secondary element, or a disturbance and the like, is difficult to specify or predict beforehand. For example, in a case where the secondary element contacts an unpredicted external object and the like, situations where it becomes difficult to appropriately move the secondary element, or situations where an excessive external force acts on the secondary element, tends to occur.

Therefore, in recent years, in order to realize a robot and the like capable of operating flexibly under various external environments, a power transmission device of a structure in which the primary element and the secondary element are coupled by a member capable of deforming elastically (hereinafter sometimes referred to as an elastic deformation member), such as a spring member, and a force applied to the secondary element via the elastic deformation member is controlled to a desired value, has been studied by the present inventors and the like.

In an operational control (a power control) of the power transmission device of a structure in which the primary element and the secondary element are coupled via the elastic deformation member, it is generally difficult to perform stable control in which oscillation and the like of a control system does not occur with respect to various condition variation such as a variation in an inertia of a load, by a versatile control method such as a PD control.

Therefore, the present inventors had attempted to adopt a method of a sliding-mode control, which has a characteristics of having high robustness with respect to variation of disturbance and the like, in the operational control of the above-mentioned power transmission device including the elastic deformation member.

The sliding-mode control is for converging a state amount of a control object to a desired value, on a switching hyperplane that is defined by a switching function (a hyperplane represented by a format of a switching function=0). Therefore, in the sliding-mode control, there is a necessity of appropriately setting the switching hyperplane.

The term "hyperplane" is an expression of generalizing a plane in a phase space of a plurality of dimensions. The hyperplane means a straight line in the phase space of two dimensions, and a normal plane in the phase space of three dimensions.

As a method of setting the switching hyperplane to be used in the sliding-mode control (specifically, a method of determining the coefficient of the switching function), a method of determining the coefficient of the switching function so as to minimize a predetermined evaluation function by applying, for example, a method of an optimum control, or a method of determining the switching function in a manner as is shown in Patent Document 1, are conceivable.

However, in a case of applying the method of the optimum control in order to determine the coefficient of the switching function, there is a necessity of appropriately determining a value of a weight coefficient in the evaluation function. Further, even in the technique disclosed in Patent Document 1, there is a necessity of appropriately determining a value of a gain related to each member of the switching function.

A current status is that, in performing the operational control of the power transmission device performing the power transmission between the primary element and the secondary element through the intermediary of the elastic deformation member by the sliding-mode control, a guideline on how to determine the value of the weight coefficient of the evaluation function or the value of each gain in Patent Document 1, or a guideline on efficiently performing such determination, has not been established yet.

Therefore, in the method of determining the coefficient of the switching function so as to minimize the predetermined evaluation function, or in the method of determining the switching function in the manner as is shown in Patent Document 1, numerous trial and error must be repeated in order to determine the value of the weight coefficient in the evaluation function or to determined the value of each gain in the technique of Patent Document 1. Consequently, it had been difficult to determine the appropriate switching hyperplane efficiently in these methods.

SUMMARY OF THE INVENTION

The present invention had been made in view of such background, and aims at providing a control device capable of favorably performing an operational control of a power transmission device performing power transmission via an elastic deformation member, utilizing a sliding-mode control using a switching hyperplane capable of being set efficiently and easily, with high robustness.

Further, the present invention aims at providing a method capable of setting a gradient of the switching hyperplane for sliding-mode control for the operational control of the power transmission device.

In order to achieve such object, the control device of the power transmission device of the present invention is a control device of a power transmission device equipped with a primary element which displaces by a driving power of an actuator, and a secondary element coupled to the primary element via an elastic deformation member capable of deforming elastically, and which is provided so as to relatively displace with respect to the primary element by the elastic deformation of the elastic deformation member, and to receive a power transmission from the primary element via the elastic deformation member, the control device controlling a secondary power as a power applied to the secondary element by the power transmission to a desired value, the control device comprising: a control input determining unit configured to sequentially determine a control input for controlling the driving force of the actuator, with a control processing of a sliding-mode control using a switching function configured taking a deviation between an observed value and the desired value of the secondary power as a first variable component, and a temporal change rate of the deviation as a second variable component, so as to converge the first variable component on a switching hyperplane defined by the switching function to zero; wherein a gradient of the switching hyperplane in a phase plane taking the first variable component and the second variable component as two coordinate axis components is set, based on a specific response characteristics data satisfying a predetermined requirement among a plurality of the response characteristics data preliminarily obtained as data indicating a trajectory of a transition of a set of a value of the first variable component and a value of the second variable component when the first variable component is converged from an arbitral value to zero; when a line indicating a first set value preliminarily set according to a first permissible limit value, the first permissible limit value being a preliminarily set permissible limit value of a magnitude of the value of the first variable component, between the first permissible limit value and zero, on the phase plane, is defined as a first set value line, and a line indicating a second set value preliminarily set according to a second permissible limit value, the second permissible limit value being a preliminarily set permissible limit value of a magnitude of the value of the second variable component, between the second permissible limit value and zero, on the phase plane, is defined as a second set value line, then the specific response characteristics data satisfying the predetermined requirement is a response characteristics data satisfying a requirement that the magnitude of the value of the first variable component and the magnitude of the value of the second variable component on the trajectory indicated by the specific response characteristics data are equal to or smaller than the first permissible limit value and equal to or smaller than the second permissible limit value, respectively, and that the trajectory intersects with the first set value line or the second set value line; and the gradient of the switching hyperplane is set so that, among intersections between the trajectory indicated by respective specific response characteristics data and the first set value line or the second set value line on the phase plane, a gradient of a line connecting the intersection and an origin of the phase plane coincides with or is approximate to a gradient of the line connecting an intersection satisfying a condition that it is within a preliminarily set requirement range of the gradient of the switching hyperplane, and the origin of the phase plane (a first aspect of the invention).

In the present invention, “the observed value” of an arbitral state amount, such as the secondary power, means a value which could be regarded as coinciding with an actual value of the state amount. For example, a detected value of an actual value of the state amount by an arbitral sensor, or an estimated value estimated from a detected value of an actual value of one or more of other state amounts having a certain correlativity with the state amount, on the basis of the correlativity, may be listed as “the observed value”.

Further, “the displacement” of the primary element or the secondary element may be either of a rotational displacement and a translational displacement.

According to the first aspect of the invention, the gradient of the switching hyperplane is determined based on a specific response characteristics data satisfying the predetermined requirement, among a plurality of the response characteristics data preliminarily acquired.

Therefore, among the response characteristics data, the response characteristics data in which a magnitude of the value of the first variable component on the trajectory indicated by the response characteristics data becomes excessive exceeding the first permissible limit value, or in which a magnitude of the value of the second variable component becomes excessive exceeding the second permissible limit value, are not used as the specific response characteristics data for determining the gradient of the switching hyperplane.

Further, among the response characteristics data, the response characteristics data in which the magnitude of the value of the first variable component on the trajectory indicated by the response characteristics data is maintained to the magnitude smaller than the first set value, and also the magnitude of the value of the second variable component on the trajectory is maintained on the magnitude smaller than the second set value, that is, the response characteristics data in which the magnitude of values of both of the first variable component and the second variable component of an arbitral point on the trajectory are too small, is not used as the specific response characteristics data for determining the gradient of the switching hyperplane.

That is, only the response characteristics data in which the magnitude of the value of the first variable component of the point on the trajectory does not become excessive exceeding the first permissible limit value or the magnitude of the value of the second variable component of the point on the trajectory does not become excessive exceeding the second permissible limit value, and also the magnitude of the value of the first variable component becomes a magnitude equal to or larger than the first set value (a magnitude not too small), or the magnitude of the value of the second variable component becomes a magnitude equal to or larger than the second set value (a magnitude not too small), is used as the specific response characteristics data for determining the gradient of the switching hyperplane.

Therefore, the response characteristics data with high reliability as the one capable of performing convergence of the first variable component to zero may be used as the specific response characteristics data for determining the gradient of the switching hyperplane.

Further, the gradient of the switching hyperplane is set so that, among intersections between the trajectory indicated by respective specific response characteristics data and the first set value line or the second set value line on the phase plane, a gradient of a line connecting the intersection and an origin of the phase plane coincides with or is approximate to a gradient of the line connecting an intersection satisfying a condition that it is within a preliminarily set requirement range of the gradient of the switching hyperplane, and the origin of the phase plane.

In this case, the intersection is a point in which the value of the first variable component coincides with the first set value, or the value of the second variable component coincides with the second set value, so that it is a point in which the magnitude of the value of the first variable component or the magnitude of the value of the second variable component becomes an appropriate magnitude not too large and not too small.

Thereafter, among such intersections, the intersection satisfying the condition that the gradient of the line connecting the intersection and the origin of the phase plane is within the preliminarily determined requirement range of the gradient of the switching hyperplane (hereinafter sometimes referred to as a request matching intersection) is used, and the gradient of switching hyperplane is determined so as to coincide or approximate the gradient of the line connecting the request matching intersection and the origin of the phase plane.

The gradient of the switching hyperplane is determined as is explained above, so that the determination of the gradient of the switching hyperplane may be performed efficiently and easily, from a plurality of the obtained response characteristics data.

In this case, the control method for acquiring the response characteristics data is not limited to a specific control method, so that the same may be easily acquired using a versatile control method such as a PD control.

Further, determining the gradient of the switching hyperplane using the request matching intersection may be performed by, for example, a known statistical identification method such as a least squares method and the like.

Further, in the present invention, the gradient of the switching hyperplane is determined as is explained above, so that the control input determining element may determine the control input by the control processing of the sliding-mode control, so as to control the secondary power to the desired value, with high robustness and with a desired converging characteristics.

Therefore, according to the first aspect of the invention, the operational control of the power transmission device may be favorably performed, utilizing the sliding-mode control using the switching hyperplane that may be set efficiently and easily, with high robustness.

In the first aspect of the invention, the elastic deformation member may be a member configured so that an elastic deformation coefficient which represents a rate of change of a generated elastic force of the elastic deformation member with respect to a change in a deformation amount thereof becomes constant.

The term the elastic deformation coefficient being "constant" does not mean that it is strictly constant, but means that the elastic deformation coefficient is maintained constant or approximately constant within a practical deformation range of the elastic deformation member in the power transmission device. Further, the elastic deformation coefficient has a meaning as the one corresponding to a so-called spring constant.

In this case, it is preferable that the first permissible limit value is a value determined, so that a displacement velocity and a displacement acceleration of the primary element by the driving force of the actuator do not exceed preliminarily set permissible limit values, respectively, according to the permissible limit value of the displacement velocity of the primary element, the permissible limit value of the displacement acceleration of the primary element, and a value of the elastic deformation coefficient of the elastic deformation member (a second aspect of the invention).

According to the second aspect of the invention, the gradient of the switching hyperplane may be determined using the response characteristics data in which the displacement velocity and displacement acceleration of the primary element do not exceed the respective preliminarily determined permissible limit value, among a plurality of the response characteristics data.

As such, it becomes possible to perform the control of the operation of the power transmission device so that the displacement velocity and the displacement acceleration of the primary element do not exceed the respective preliminarily set permissible limit value, with high reliability. Consequently, it becomes possible to stably perform the operation of the power transmission device in a region in which the displacement velocity or the displacement acceleration of the primary element is close to the permissible limit value.

In the second aspect of the invention, it is preferable that the second permissible limit value is a value determined according to the value of the elastic deformation coefficient of the elastic deformation member, so as to prevent generation of oscillation of a power transmission system from the actuator to the secondary element according to a natural oscillation of the power transmission system (a third aspect of the invention).

According to the third aspect of the invention, it becomes possible to determine the gradient of the switching hyperplane, using the response characteristics data in which the oscillation of the power transmission system according to the natural oscillation is not generated, among a plurality of the response characteristics data.

As such, it becomes possible to perform the control of the operation of the power transmission device so that the oscillation of the power transmission system according to the natural oscillation is not generated, or is difficult to be generated, with high reliability.

The determination of the second permissible limit value as in the third aspect of the invention is not based on the premise that the first permissible limit value is determined as in the second aspect of the invention.

That is, it is preferable that, in the first aspect of the invention, the elastic deformation member is a member configured so that an elastic deformation coefficient which represents a rate of change of a generated elastic force of the elastic deformation member with respect to a change in a deformation amount thereof becomes constant, and the second permissible limit value is a value determined according to the value of the elastic deformation coefficient of the elastic deformation member, so as to prevent generation of oscillation of a power transmission system from the actuator to the secondary element according to a natural oscillation of the power transmission system (a fourth aspect of the invention).

According to the fourth aspect of the invention, similarly to the third aspect of the invention, it becomes possible to perform the control of the operation of the power transmission device so that the oscillation of the power transmission system according to the natural oscillation is not generated, or is difficult to be generated, with high reliability.

In the first aspect of the invention, the elastic deformation member may be a member configured so as to be capable of variably controlling an elastic deformation coefficient which represents a rate of change of a generated elastic force of the elastic deformation member with respect to a change in a deformation amount thereof.

In this case, it is preferable that the control input determining unit includes a switching hyperplane variable setting unit which sequentially determines the gradient of the switching hyperplane used for the control processing of the sliding-mode control for determining the control input, according to a control value of the actual elastic deformation coefficient of the elastic deformation member, the switching hyperplane variable setting unit is configured to determine the gradient of the switching hyperplane corresponding to the control value of the actual elastic deformation coefficient of the elastic deformation member, using a map data representing a relationship between a plurality of representative values of the elastic deformation coefficient preliminarily set within a variable range of the elastic deformation coefficient of the elastic deformation member, and the gradient of the switching hyperplane preliminarily set based on the specific response characteristics data according to each of the representative value, or using a predetermined arithmetic expression preliminarily set so as to approximate the relationship, and the specific response characteristics data used for setting the gradient of the switching hyperplane corresponding to an arbitral one representative value among a plurality of the representative values of the elastic deformation coefficient, is a response characteristics data satisfying the predetermined requirement corresponding to the one representative value, among the response characteristics data preliminarily acquired in a state where the elastic deformation coefficient of the elastic deformation member is maintained to the one representative value, and also the first permissible limit value, the second permissible limit value, and the requirement range of the gradient of the switching hyperplane related to the predetermined requirement, are preliminarily set according to the one representative value of the elastic deformation coefficient, respectively (a fifth aspect of the invention).

The map data or the predetermined arithmetic expression used by the switching hyperplane variable setting unit for determining the gradient of the switching hyperplane according to the control value of the elastic deformation coefficient of the elastic deformation member during the operational control of the power transmission device, is set taking the gradient of the switching hyperplane preliminarily determined corresponding to each representative value of the elastic deformation coefficient as a basis thereof.

In this case, the gradient of the switching hyperplane corresponding to an arbitral one representative value of the elastic deformation coefficient is determined based on the specific response characteristics data satisfying the predetermined requirement corresponding to the one representative value, among a plurality of the response characteristics data preliminarily obtained.

Therefore, for each representative value of the elastic deformation coefficient, the response characteristics data with high reliability as the one capable of favorably performing conversion of the first variation component to zero is used as the specific response characteristics data for determining the gradient of the switching hyperplane corresponding to the representative value.

Therefore, the gradient of the switching hyperplane for each representative value of the elastic deformation coefficient is determined using the suitable intersection in which the magnitude of the value of the first variable coefficient or the magnitude of the value of the second variable component becomes the appropriate magnitude not too large and not too small, for each representative value.

Further, the map data or the predetermined arithmetic expression is preliminarily set based on the gradient of the switching hyperplane determined for each representative value of the elastic deformation coefficient as is explained above.

Therefore, during the operational control of the power transmission device, the control input determining unit may determine the control input by the control processing of the sliding-mode control, so as to be able to control the secondary power to the desired value, with high robustness and at a desired convergence characteristics, in a state where the elastic deformation coefficient of the elastic deformation member is controlled to an arbitral value.

Therefore, it becomes possible to make the secondary power of the power transmission device controlled to the desired value favorably with high robustness, while making the elastic deformation coefficient of the elastic deformation member variable.

In the fifth aspect of the invention, it is preferable to determine the first permissible limit value or the second permissible limit value similarly as the second aspect of the invention or the third aspect of the invention.

That is, in the fifth aspect of the invention, it is preferable that the first permissible limit value corresponding to the arbitral one representative value among a plurality of the representative values of the elastic deformation coefficient is a value determined, so that a displacement velocity and a displacement acceleration of the primary element by the driving force of the actuator do not exceed preliminarily set permissible limit values, respectively, in a state where the elastic deformation coefficient of the elastic deformation member is maintained to the one representative value, according to the permissible limit value of the displacement velocity of the primary element, the permissible limit value of the displacement acceleration of the primary element, and the one representative value of the elastic deformation coefficient (a sixth aspect of the invention).

According to the sixth aspect of the invention, for each representative value of the elastic deformation coefficient, the gradient of the switching hyperplane may be determined using the response characteristics data in which the displacement velocity and the displacement acceleration of the primary element do not exceed the respective preliminarily set permissible limit value, among a plurality of the response characteristics data.

Therefore, during the operational control of the power transmission device, it becomes possible to perform the control of the operation of the power transmission device so that the displacement velocity and the displacement acceleration of the primary element do not exceed the respective preliminarily set permissible limit value, without depending on the control state of the elastic deformation coefficient of the elastic deformation member, with high reliability. Consequently, it becomes possible to stably perform the operation of the power transmission device in the region in which the displacement velocity or the displacement acceleration of the primary element becomes close to the permissible limit value, without depending on the control state of the elastic deformation coefficient of the elastic deformation member.

Further, in the fifth aspect or the sixth aspect of the invention, it is preferable that the second permissible limit value corresponding to the arbitral one representative value among a plurality of the representative values of the elastic deformation coefficient, is a value determined according to the one representative value, so as to prevent generation of oscillation of a power transmission system from the actuator to the secondary element according to a natural oscillation of the power transmission system, in a state where the elastic deformation coefficient of the elastic deformation member is maintained to the one representative value (a seventh aspect of the invention).

According to the seventh aspect of the invention, for each representative value of the elastic deformation coefficient, the gradient of the switching hyperplane may be determined using the response characteristics data in which the oscillation of the power transmission system according to the natural oscillation is not generated, among a plurality of the response characteristics data.

Therefore, it becomes possible to perform the control of the operation of the power transmission device, so that the oscillation of the power transmission system according to the natural oscillation is not generated, or is difficult to be generated, without depending on the control state of the elastic deformation coefficient of the elastic deformation member, with high reliability.

Further, in the second aspect or the third aspect of the invention equipped with the elastic deformation member configured so that the elastic deformation coefficient is constant, it is preferable that the gradient of the switching hyperplane is set, taking a condition that a time constant of convergence of the value of the first variable component on the switching hyperplane defined by the gradient of the switching hyperplane to zero becomes equal to or larger than a specific time constant, the specific time constant being a time constant realized in a case supposing that the value of the first variable component is changed stepwise from zero to the first permissible limit value and also the convergence of the value of the first variable component to zero is performed so that the displacement acceleration of the primary element by the driving force of the actuator becomes the permissible limit value of the displacement acceleration, as a constraint condition (an eighth aspect of the invention).

The above applies similarly to the fourth aspect of the invention (a ninth aspect of the invention).

That is, in a case where changing the value of the first variable component stepwise from zero to a value equal to or smaller than the first permissible limit value is assumed, then in a case where the value of the first variable component is changed from zero to the first permissible limit value, the displacement amount of the primary element with respect to the secondary element, and consequently, the displacement amount of the elastic deformation member becomes the maximum.

In this case, the displacement of the primary element with respect to the secondary element (and consequently the deformation of the elastic deformation member) is limited to the displacement at the displacement acceleration equal to or smaller than the permissible limit value. Therefore, a time constant of convergence of the value of the first variable component to zero cannot be smaller than the specific time constant.

Therefore, in the eighth aspect or the ninth aspect of the invention, the gradient of the switching hyperplane is set, taking the fact that the time constant of convergence of the value of the first variable component to zero on the switching hyperplane defined by the gradient of the switching hyperplane becomes equal to or lager than the specific time constant, as the constraint condition.

Therefore, according to the eighth aspect or the ninth aspect of the invention, during operational control of the power transmission device, it becomes possible to stably perform controlling of the secondary power to the desired value with high robustness, in a wide operation range of the power transmission device.

In the eighth aspect of the invention, for example, it is preferable that the specific time constant is a time constant calculated as a value proportional to an inverse value of a square root of a value of the elastic deformation coefficient, from the first permissible limit value, the permissible limit value of the displacement acceleration of the primary element, and the value of the elastic deformation coefficient of the elastic deformation member (a tenth aspect of the invention). The above applies similarly to the ninth aspect of the invention (an eleventh aspect of the invention).

According to the tenth aspect or the eleventh aspect of the invention, it becomes possible to appropriately specify the specific time constant matching the value of the elastic deformation coefficient of the elastic deformation member, so that the reliability of the setting of the gradient of the switching hyperplane may be improved.

It is preferable that the technique similar to the eighth aspect of the invention or the ninth aspect of the invention is adopted to the fifth through the seventh aspect of the invention equipped with the elastic deformation member configured so as to be capable of controlling the elastic deformation coefficient variably.

That is, in the fifth through the seventh aspect of the invention, it is preferable that the gradient of the switching hyperplane corresponding to the arbitral one representative value among a plurality of the representative values of the elastic deformation coefficient is set, taking a condition that the time constant of the convergence of the value of the first variable component to zero on the switching hyperplane defined by the gradient of the switching hyperplane becomes equal to or larger than a specific time constant, the specific time constant being a time constant realized in a case supposing that the value of the first variable component is changed stepwise from zero to the first permissible limit value and also the convergence of the value of the first variable component to zero is performed so that the displacement acceleration of the primary element by the driving force of the actuator becomes the permissible limit value of the displacement acceleration, in a state where the elastic deformation coefficient of the elastic deformation member is maintained to the one representative value, as a constraint condition (a twelfth aspect of the invention).

According to the twelfth aspect of the invention, the gradient of the switching hyperplane corresponding to each representative value of the elastic deformation coefficient is set, taking a fact that the time constant of convergence of the value of the first variable component to zero on the switching hyperplane defined by the gradient of the switching hyperplane becomes equal to or larger than the specific time constant corresponding to the representative value, as the constraint condition.

Therefore, according to the twelfth aspect of the invention, during the operational control of the power transmission device, the time constant of convergence corresponding to an arbitral gradient of the switching hyperplane determined by the switching hyperplane variable setting unit, may become equal to or larger than the specific time constant corresponding to the control value of the elastic deformation coefficient of the elastic deformation member at the time point of determining the gradient.

Therefore, according to the twelfth aspect of the invention, it becomes possible to perform controlling of the secondary power to the desired value stably with high robustness, in a wide operating region of the power transmission device, without depending on the control state of the elastic deformation coefficient of the elastic deformation member.

In the twelfth aspect of the invention, it is preferable that the specific time constant corresponding to the arbitral one representative value among a plurality of the representative values of the elastic deformation coefficient is a time constant calculated as a value proportional to an inverse value of a square root of the one representative value, from the first permissible limit value, the permissible limit value of the displacement acceleration of the primary element, and the one representative value of the elastic deformation coefficient of the elastic deformation member (a thirteenth aspect of the invention).

According to the thirteenth aspect of the invention, the specific time constant matching each representative value of the elastic deformation coefficient of the elastic deformation member may be appropriately specified, so that the gradient of the switching hyperplane for each representative value may be determined to a suitable gradient for stably performing controlling of the secondary power to the desired value with high robustness.

Consequently, during the operational control of the power transmission device, it becomes possible to improve the reliability of the gradient of the switching hyperplane determined by the switching hyperplane variable setting unit with the map data or the predetermined arithmetic expression.

Further, in the twelfth or the thirteenth aspect of the invention, it is preferable that the switching hyperplane variable setting unit is configured to determine the gradient of the switching hyperplane corresponding to the control value of the actual elastic deformation coefficient of the elastic deformation member, using a predetermined arithmetic expression preliminarily set so as to approximate a relationship between a plurality of the representative values of the elastic deformation coefficient, and the gradient of the switching hyperplane preliminarily set based on the specific response characteristics data according to each of the representative value, and the arithmetic expression is set so that a time constant defined by the gradient of the switching hyperplane determined using the arithmetic expression becomes a value equal to or larger than a value proportional to an inverse value of a square root of the value of the elastic deformation coefficient (a fourteenth aspect of the invention).

According to the fourteenth aspect of the invention, during the operational control of the power transmission device, in an arbitral control state of the elastic deformation coefficient of the elastic deformation member, it becomes possible to perform determining of the gradient of the switching hyperplane corresponding to the value of the elastic deformation coefficient by using the predetermined arithmetic expression, so that the time constant corresponding to the gradient becomes equal to or larger than the specific time constant corresponding to the value of the elastic deformation coefficient, with high reliability.

In the first aspect through the fourteenth aspect of the present invention, it is preferable that the control device further comprises an observer which sequentially calculates an estimated value of the first variable component and an estimated value of the second variable component, that are obtained by reducing an influence of disturbance from an observed value of the first variable component calculated from the observed value of the secondary power and the desired value of the secondary power, and an observed value of the second variable component calculated as a temporal change rate of the observed value of the first variable component, and the control input determining unit is configured to calculate the value of the switching function using the estimated value of the first variable component and the estimated value of the second variable component calculated by the observer, in place of the observed value of the first variable component and the observed value of the second variable component, and to sequentially generate the control input by the control processing of the sliding-mode control using the value of the switching function (a fifteenth aspect of the invention).

According to the fifteenth aspect of the invention, the influence of the disturbance is suppressed, by calculating the value of the switching function using the estimated value of the first variable component and the estimated value of the second variable component calculated by the observer, and by sequentially generating the control input by the control processing of the sliding-mode control using the value of the switching function.

Therefore, the stability of the control input sequentially determined by the control input determining unit is improved. Consequently, it becomes possible to further improve the robustness of the control of the secondary power.

Further, a gradient setting method of a switching hyperplane for a sliding-mode control of the present invention is a method of preliminarily setting parameters used in a control processing of a control device of a power transmission device equipped with a primary element which displaces by a driving power of an actuator, and a secondary element coupled to the primary element via an elastic deformation member capable of deforming elastically, and which is provided so as to relatively displace with respect to the primary element by the elastic deformation of the elastic deformation member, and to receive a power transmission from the primary element via the elastic deformation member, the control device controlling a secondary power as a power applied to the secondary element by the power transmission to a desired value, wherein:

the control device is a device configured to sequentially determine a control input for controlling the driving force of the actuator, with a control processing of a sliding-mode control using a switching function configured taking a deviation between an observed value and the desired value of the secondary power as a first variable component, and a temporal change rate of the deviation as a second variable component, so as to converge the first variable component on a switching hyperplane defined by the switching function to zero;

the parameter is a gradient of the switching hyperplane in a phase plane taking the first variable component and the second variable component as two coordinate axis components;

the method comprises a first step of obtaining a plurality of response characteristics data indicating a trajectory of a transition of a set of a value of the first variable component and a value of the second variable component, by an experiment or a simulation of control processing to converge the first variable component from an arbitral value to zero; and a second step of setting the gradient of the switching hyperplane based on a specific response characteristics data satisfying a predetermined requirement among a plurality of the obtained response characteristics data;

when a line indicating a first set value preliminarily set according to a first permissible limit value, the first permissible limit value being a preliminarily set permissible limit value of a magnitude of the value of the first variable component, between the first permissible limit value and zero, on the phase plane, is defined as a first set value line, and a line indicating a second set value preliminarily set according to a second permissible limit value, the second permissible limit value being a preliminarily set permissible limit value of a magnitude of the value of the second variable component, between the second permissible limit value and zero, on the phase plane, is defined as a second set value line, then the specific response characteristics data satisfying the predetermined requirement is a response characteristics data satisfying a requirement that the magnitude of the value of the first variable component and the magnitude of the value of the second variable component on the trajectory indicated by the specific response characteristics data are equal to or smaller than the first permissible limit value and equal to or smaller than the second permissible limit value, respectively, and that the trajectory intersects with the first set value line or the second set value line; and the second step is a step of setting the gradient of the switching hyperplane so that, among intersections between the trajectory indicated by respective specific response characteristics data and the first set value line or the second set value line on the phase plane, a gradient of a line connecting the intersection and an origin of the phase plane coincides with or is approximate to a gradient of the line connecting an intersection satisfying a condition that it is within a preliminarily set requirement range of the gradient of the switching hyperplane, and the origin of the phase plane (a sixteenth aspect of the invention).

According to the sixteenth aspect of the invention, the gradient of the switching hyperplane is set based on the specific response characteristics data satisfying the predetermined requirement, among a plurality of the response characteristics data acquired in the first step.

In this case, the predetermined requirement is the same as that explained in the first aspect of the invention. Therefore, the response characteristics data having high reliability as the one capable of favorably performing the convergence of the first variable component to zero may be used as the specific response characteristics data for determining the gradient of the switching hyperplane.

Further, the control processing in the first step is not limited to a specific control method. Therefore, the response characteristics data may be acquired easily using a versatile control method such as a PD control.

Also, in the second step, the gradient of the switching hyperplane is determined so as to coincide with or is approximate to the gradient of the line connecting the request matching intersection explained in the first aspect of the invention and the origin of the phase plane.

In this case, determining the gradient of the switching hyperplane may be performed by a known statistical identification method such as a least squares method and the like.

Therefore, it becomes possible to determine the gradient of the switching hyperplane effectively and easily, from a plurality of the response characteristics data obtained in the first step.

Therefore, according to the sixteenth aspect of the invention, the gradient of the switching hyperplane for the sliding-mode control for the operational control of the power transmission device may be set appropriately.

Further, in the sixteenth aspect of the invention, similar mode as those in the second aspect through the thirteenth aspect of the invention may be adopted.

DESCRIPTION OF THE PREFERRED EMBODIMENTS

First Embodiment

A first embodiment of the present invention will be explained below with reference to FIG. 1 through FIG. 6.

Figure 1:
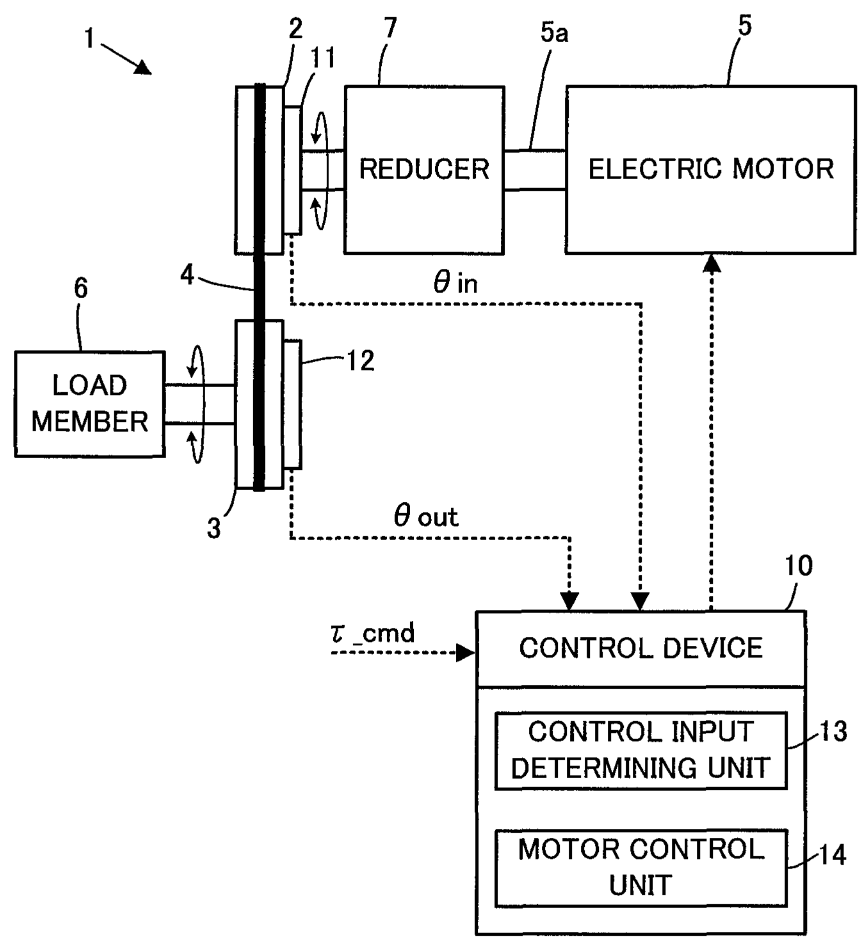
FIG. 1 is a view showing a system configuration according to a first embodiment of the present invention.

As is shown in FIG. 1, a power transmission device 1 of the present embodiment is equipped with a drive pulley 2 as a primary element, a driven pulley 3 as a secondary element, a wire 4 which performs rotational transmission between the pulleys 2, 3, an electric motor 5 as an actuator for imparting a rotational driving force to the drive pulley 2, and a load member 6 fixed to the driven pulley 3 so as to rotate integrally with the driven pulley 3.

In FIG. 1, the load member 6 is described as an integrated structure. However, it is not limited to an integrated structure. For example, the load member 6 may be the one in which a plurality of members are coupled by joints and the like (for example, a link mechanism having a plurality of joints, and the like).

The drive pulley 2 is connected to an output shaft 5*a* via a reducer 7. Further, the drive pulley 2 rotates by a rotational driving force (torque) applied from the output shaft 5*a* of the electric motor 5 via the reducer 7, in conjunction with the rotation of the output shaft 5*a* of the electric motor 5.

The reducer 7 may be of an arbitral structure. For example, a reducer configured from a harmonic drive (registered trademark) or from a plurality of gears may be adopted as the reducer 7. Alternatively, the reducer 7 may be equipped with a mechanism for converting a direct action to a rotational movement. In this case, as the actuator, for example, a direct acting actuator configured from an electric motor and a ball screw, or an electrically-operated linear motor and the like, may be adopted.

Further, in FIG. 1, the electric motor 5 and the drive pulley 2 are arranged to have coaxial core. However, rotational shaft centers thereof may not necessarily be coaxial.

The driven pulley 3 is provided laterally to the side of the drive pulley 2, so that a rotational shaft center thereof becomes parallel to a rotational shaft center of the drive pulley 2. The pulleys 2, 3 are coupled at outer peripheral portions thereof via the wire 4.

More specifically, the wire 4 is stretched so that one of both end portion is fixed to the drive pulley 2 and the other is fixed to the driven pulley 3, and so as to extend in a tangential direction of the pulleys 2, 3. As such, the rotational transmission between the drive pulley 2 and the driven pulley 3 is performed by a tensile force of the wire 4.

The wire 4 may be respectively provided, when viewing in a rotational shaft center direction of the drive pulley 2 and the driven pulley 3, to both sides in a direction orthogonal to a direction of an interval between the pulleys 2, 3.

Further, the wire 4 may be an endless member wound around the drive pulley 2 and the driven pulley 3.

The wire 4 is configured from an elastic deformation member (a member capable of deforming elastically). Therefore, the transmission of the rotational driving force (torque) from the drive pulley 2 to the driven pulley 3 is performed via an elastic force (in this case, tensile force) generated by the elastic deformation (in this case, expansion and contradiction) of the wire 4. Further, accompanying the elastic deformation of the wire 4, an angular difference between a rotational angle $\theta in$ of the drive pulley 2 and a rotational angle $\theta out$ of the driven pulley 3 ($=\theta in-\theta out$, hereinafter referred to as the between-pulley rotational angular difference) is generated. The between-pulley rotational angular difference corresponds to a deformation amount of the wire 4.

In this case, the torque applied to the driven pulley 3 by the transmission of the rotational driving force from the drive pulley 2 to the driven pulley 3 (hereinafter referred to as a secondary torque $\tau$) is proportional to (or is approximately proportional to) the between-pulley rotational angular difference, as is shown in following expression (1).

$$\tau = Ksp \cdot (\theta in - \theta out) \quad (1)$$

In the expression (1), Ksp is an elastic deformation coefficient indicating a level of rigidity of the wire 4, and in the present embodiment, means a rate of change of the secondary torque $\tau$ (stated otherwise, a generated elastic force of the wire 4) with respect to a change of the between-pulley rotational angular difference (stated otherwise, the deformation amount of the wire 4) (a change amount of the secondary torque $\tau$ per unit change amount of the between-pulley rotational angular difference).

In the present embodiment, the wire 4 is configured so that the elastic deformation coefficient Ksp in the expression (1) is maintained constant (or substantially constant). The elastic deformation coefficient Ksp of the wire 4 should only be constant (or substantially constant) within a range of practical values of the secondary torque $\tau$ or the between-pulley rotational angular difference of the power transmission device 1, and the value of the elastic deformation coefficient Ksp may not necessarily be constant outside the range.

The above is a mechanistic configuration of the power transmission device 1 of the present embodiment.

The present embodiment is equipped with, as a configuration for an operational control of the power transmission device 1, a control device 10, and angle detectors 11, 12 respectively detecting the rotational angle $\theta$in of the drive pulley 2 and the rotational angle $\theta$out of the driven pulley 3.

The angle detectors 11, 12 are, for example, configured from a rotary encoder, and are respectively provided opposing the drive pulley 2 and the driven pulley 3. The angle detectors 11, 12 may be configured from angle sensors other than the rotary encoder, such as a potentiometer.

The control device 10 is configured from an electronic circuit unit including a CPU, a RAM, a ROM, an interface circuit and the like. The control device 10 is input with output signals (detection signals) of the angle detectors 11, 12. Further, to the control device 10, a desired value $\tau$_cmd of the secondary torque $\tau$ (hereinafter referred to as a desired secondary torque $\tau$_cmd) is sequentially input from other control device or servers outside.

The desired secondary torque $\tau$_cmd is a desired value for performing desired operation of the load member 6. The desired secondary torque $\tau$_cmd may be sequentially determined at the control device 10.

By executing a predetermined program processing using the input detecting signals and the desired secondary torque $\tau$_cmd, the control device 10 is configured to sequentially decide a control input for controlling an operation of the electric motor 5. Further, the control device 10 is configured to control an operation of the electric motor 5 according to the control input.

In this case, the control device 10 is equipped with, as a function realized by a program processing (a function realized by a software) or a main function realized by a hardware configuration, a control input determining unit 13 which sequentially determines the control input so as to make the actual secondary torque $\tau$ (an observed value) follow the desired secondary torque $\tau$_cmd, and a motor control unit 14 which controls an energization current (and consequently an output torque) of the electric motor 5 according to the control input via a motor drive circuit not shown.

The control input is, in the present embodiment, for example a desired torque (a desired value of the output torque) of the electric motor 5. However, the control input may only be the one capable of defining the desired torque of the electric motor 5. Therefore, the control input may be other than the desired torque. For example, as the control input, a desired value of the torque imparted to the drive pulley 2 itself from the electric motor 5 side, or a desired value of the energization current of the electric motor 5, or the like may be used.

The control input determining unit 13 is configured to determine the control input for making the actual secondary torque $\tau$ (the observed value) follow the desired secondary torque $\tau$_cmd, by a control processing of a sliding-mode control.

Basic matters with respect to a control processing of the sliding mode will be explained.

A behavior of the power transmission device 1 as a system of a controlled object in the present embodiment is modeled in a discrete system by a state equation of following expression (2).

$$\begin{bmatrix} \theta\ in\ (n) \\ d\theta\ in\ (n) \\ \theta\ out\ (n) \\ d\theta\ out\ (n) \end{bmatrix} = \begin{bmatrix} 1 & DT & 0 & 0 \\ -rin \cdot DT & 1 & rin \cdot DT & 0 \\ 0 & 0 & 1 & DT \\ rout \cdot DT & 0 & -rout \cdot DT & 1 \end{bmatrix} \cdot \begin{bmatrix} \theta\ in\ (n-1) \\ d\theta\ in\ (n-1) \\ \theta\ out\ (n-1) \\ d\theta\ out\ (n-1) \end{bmatrix} + \begin{bmatrix} 0 \\ DT/Iin \\ 0 \\ 0 \end{bmatrix} \cdot u(n-1) \quad (2)$$

where, $r\ in \equiv Ksp/I\ in,$ $r\ out \equiv Ksp/I\ out$

Here, $\theta$in is the rotational angle of the drive pulley 2, $\theta$out is the rotational angle of the driven pulley 3, d$\theta$in is a temporal change rate of $\theta$in (that is, a rotational angular velocity of the drive pulley 2), d$\theta$out is a temporal change rate of $\theta$out (that is, a rotational angular velocity of the driven pulley 3), DT is a control processing cycle, Ksp is the elastic deformation coefficient of the wire 4, Iin is an inertia of the drive pulley 2 side (an input side inertia), Iout is an inertia of the driven pulley 3 side (an output side inertia), and u is the input torque of the drive pulley 2 side (for example, the output torque of the electric motor 5). Further, suffixes with brackets, n, n−1, are numbers representing time of the discrete system.

On the other hand, by the above-mentioned expression (1), following expressions (3a), (3b) stand with respect to the secondary torque $\tau$ and a temporal change rate d$\tau$ thereof (hereinafter referred to as a secondary torque change speed d$\tau$).

$$\tau(n) = Ksp \cdot (\theta in(n) - \theta out(n)) \quad (3a)$$

$$d\tau(n) = Ksp \cdot (d\theta in(n) - d\theta out(n)) \quad (3b)$$

When simplifying the above-mentioned expression (2) using these expressions (3a), (3b), a state equation of following expression (4) is obtained as a model expressing a behavior with respect to $\tau$, d$\tau$ in the power transmission device 1 of the present embodiment.

$$\begin{bmatrix} \tau(n) \\ d\tau(n) \end{bmatrix} = A \cdot \begin{bmatrix} \tau(n-1) \\ d\tau(n-1) \end{bmatrix} + B \cdot u(n-1) \tag{4}$$

where, $$A \equiv \begin{bmatrix} 1 & DT \\ -rin \cdot DT - rout \cdot DT & 1 \end{bmatrix}$$

$$B \equiv \begin{bmatrix} 0 \\ Ksp \cdot DT / Iin \end{bmatrix}$$

In the sliding mode control in the present embodiment, the control processing for determining the control input is established, according to the state equation (the model) of this expression (4).

More specifically, in the present embodiment, as a state variable of the control object of the sliding-mode control, as is represented by following expression (5), a state variable X (a column vector of two-rows and one-column) configured taking a secondary torque deviation τ_err which is a deviation between the actual secondary torque τ (the observed value) and the desired secondary torque τ_cmd, and a secondary torque deviation velocity dτ_err which is a temporal change rate (a differential value) of the deviation τ_err, as two components thereof. In the expression (5), a superscript suffix "T" means transposition.

$$X=[\tau\_err, d\tau\_err]^T \tag{5}$$

where τ_err=τ−τ_cmd, and dτ_err=temporal change rate (differential value) of τ_err In this case, a desired torque τm_cmd of the electric motor 5 as the control input of the sliding-mode control (a new desired torque determined in each control process cycle) may be determined, for example by following expression (6), using A and B defined in a where clause in the above-mentioned expression (4) and a switching function σ represented by following expression (7).

$$\tau m\_cmd(n) = -(S \cdot B)^{-1} \cdot (S \cdot A \cdot X(n) + Ksld \cdot (\sigma(n)/(|\sigma(n)| + \delta))) \tag{6}$$

$$\sigma(n) = S \cdot X(n) = s1 \cdot \tau err(n) + s2 \cdot d\tau\_err(n) \tag{7}$$

where S=[s1, s2] (:vector of two-rows one-column)

These expressions (6), (7) are basic expressions for determining the desired torque τm_cmd of the electric motor 5 as the control input in the present embodiment.

In this case, each component of A, B necessary for calculation of the right side of the expression (6) is a predetermined value preliminarily set (a value of constant) based on defining expression in a where clause of the expression (4). Further, each component s1, s2 of S (coefficient component constituting the switching function σ) is a predetermined value (a value of constant) preliminarily set as is explained later.

Explanation will be given on the technical meaning of the expressions (6) and (7). The first column on the right side of the expression (6) means a control input component which functions so as to converge τ_err and dτ_err to zero, in a state where a pair of values of τ_err and dτ_err exists on a switching hyperplane.

The switching hyperplane is represented by a formula σ=0. Therefore, a gradient of the switching hyperplane σ=0 (in the present case, straight line) in a phase plane taking τ_err and dτ_err as two coordinate axis components is defined by a proportion of each components s1, s2 of S.

Figure 2:
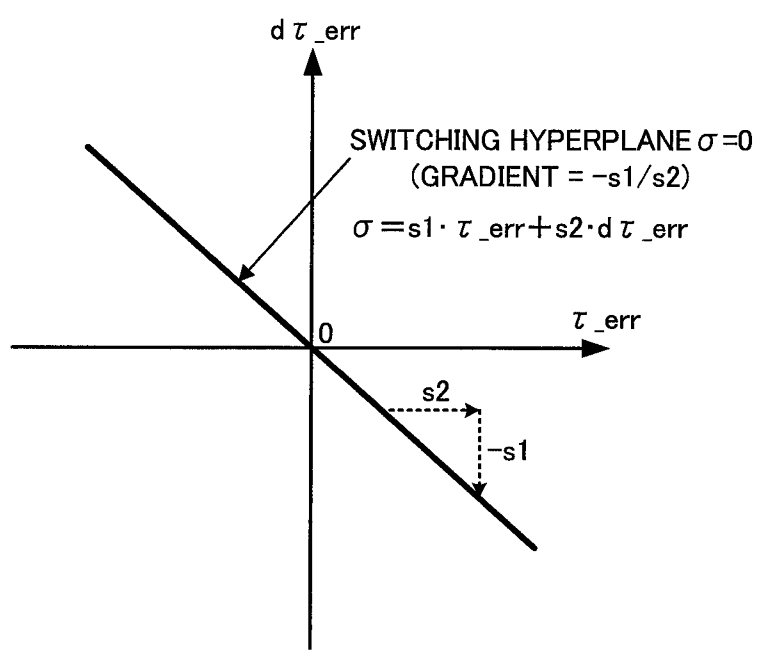
FIG. 2 is a view showing a switching hyperplane of a sliding-mode control.

For example, as is shown in FIG. 2, in a case of assuming a phase plane taking the coordinate axis of the secondary torque deviation velocity dτ_err as an axis of ordinate, and the coordinate axis of the secondary torque deviation τ_err as an axis of abscissas, the gradient of the switching hyperplane σ=0 (straight line) in the phase plane becomes −s1/s2. In a case where a phase plane taking the coordinate axis of the secondary torque deviation velocity dτ_err as the axis of abscissas and the coordinate axis of the secondary torque deviation τ_err as the axis of ordinate is assumed, the gradient of the switching hyperplane σ=0 in the phase plane becomes −s2/s1.

On the switching hyperplane σ=0, dτ_err=(−s1/s2)·τ_err, so that when (−s1/s2) is set to a negative value, then τ_err on the switching hyperplane σ=0 converges to zero. Further, in this case, a time constant Tc of convergent response of τ_err on the switching hyperplane σ=0 is given by following expression (8).

$$Tc=s2/s1 \tag{8}$$

As such, the gradient of the switching hyperplane σ=0, or the time constant Tc of the convergent response of τ_err on the switching hyperplane σ=0, is defined by a proportion of the coefficient components s1, s2.

To supplement, in a case of assuming a phase plane taking the coordinate axis of the secondary torque deviation velocity dτ_err as the axis of ordinate, and the coordinate axis of the secondary torque deviation τ_err as the axis of abscissas, the gradient of the switching hyperplane σ=0 in the phase plane becomes −s1/s2, so that the relationship between the gradient and the time constant Tc becomes gradient=−1/Tc.

On the other hand, in a case of assuming a phase plane taking the coordinate axis of the secondary torque deviation velocity dτ_err as the axis of abscissas, and the coordinate axis of the secondary torque deviation τ_err as the axis of ordinate, the gradient of the switching hyperplane σ=0 in the phase plane becomes −s2/s1, so that the relationship between the gradient and the time constant Tc becomes gradient=−Tc.

In the present embodiment, the gradient of the switching hyperplane σ=0 is determined preliminarily as is explained later. Therefore, the values of the coefficient components s1, s2 necessary for the calculation of the expression (7) are preliminarily set according to the gradient.

In this case, one of the values of s1, s2 may be a value of constant, and for example, s1=1 (or s2=1). In this case, by determining the gradient of the switching hyperplane σ=0, the value of the coefficient component s2 (or the coefficient component s1) is determined unambiguously.

The above-mentioned time constant Tc is determined unambiguously according to the gradient of the switching hyperplane σ=0. Therefore, determining the gradient of the switching hyperplane σ=0 is equivalent to determining the above-mentioned time constant Tc.

The second column on the right side of the expression (6) means a control input component functioning to converge the value of the switching function σ to zero (stated otherwise, to converge a set of values of τ_err and dτ_err on the switching hyperplane σ=0). Further, Ksld and δ respectively are parameters defining a convergence characteristics of the value of the switching function σ.

In this case, δ is a predetermined value (a value of constant) preliminarily set according to experiments and the like.

Further, the value of Ksld is determined according to a predetermined value (a steady value) or a value of a switching function, for example by a following guideline.

That is, in order to converge the value of the switching function σ to zero, a differential value (temporal change rate) of a Liapunov function $\sigma^2$ of σ must be a negative value.

This necessary condition is equivalent to a condition of satisfying $(\sigma(n))^2-(\sigma(n-1))^2<0$ in the discrete system. And, from this condition and from the expressions (6), (7), a condition of following expression (9) related to Ksld is obtained.

$$|Ksld|<|\sigma(n)|+\delta \quad (9)$$

Therefore, the value of Ksld only needs to be set so as to satisfy the condition of the expression (9).

In the present embodiment, the value of Ksld is determined variably according to the value of σ, so that a magnitude of Ksld becomes larger, as an absolute value of the switching function σ in each control processing cycle becomes larger.

For example, Ksld is determined so as to become a value proportional to |σ(n)|, in each control processing cycle, as is shown in following expression (10).

$$Ksld=(1/K0)\cdot|\sigma(n)| \quad (10)$$

K0 in expression (10) is a value of constant preliminarily set so as to satisfy the condition of expression (9), within a range of actual values that σ(n) could take (for example, an integer of 3 or more).

The value of Ksld may be a steady value. Further, the value of Ksld may be set so that |Ksld|<δ holds.

Next, explanation will be given on an advance preparation process for determining the values of the coefficient components s1, s2 of the above-mentioned switching function σ. In the present embodiment, the advance preparation process is performed according to a following procedure.

(Procedure 1)

First, by an arbitrary control method (for example, PD control and the like), an experiment (or a simulation) of controlling the secondary torque τ of the power transmission device 1 to converge from various arbitral initial states of the power transmission device 1 to various arbitral desired values (desired values changed stepwise) is performed.

In the experiment, the output torque of the electric motor 5 is operated so as to converge a deviation between the desired value of the secondary torque τ and the observed value of the actual value to zero, by a versatile control law such as a PD control law, according to the deviation. In this case, the observed value of the actual value of the secondary torque τ may be calculated on the basis of the above-mentioned expression (1), for example from a detected value of the between-pulley rotational angular difference of the power transmission device 1. Alternatively, the actual value of the secondary torque τ may be detected using an arbitral torque sensor. Further, the operational control of the electric motor 5 may be performed using an arbitral computer and the like.

Further, a transition (temporal change) of a set of the values of the secondary torque deviation τ_err and the value of the secondary torque deviation velocity dτ_err in each experiment of the above-mentioned convergence control is measured. Further, by plotting the measured data on the phase plane taking τ_err and dτ_err as the two coordinate axis components, a response characteristics data indicating a trajectory of the transition of the set of values of τ_err and dτ_err is created.

As is explained above, a plurality of the response characteristics data in which conditions such as the initial state and the desired value of the secondary torque τ are varied, are created.

Figure 3:
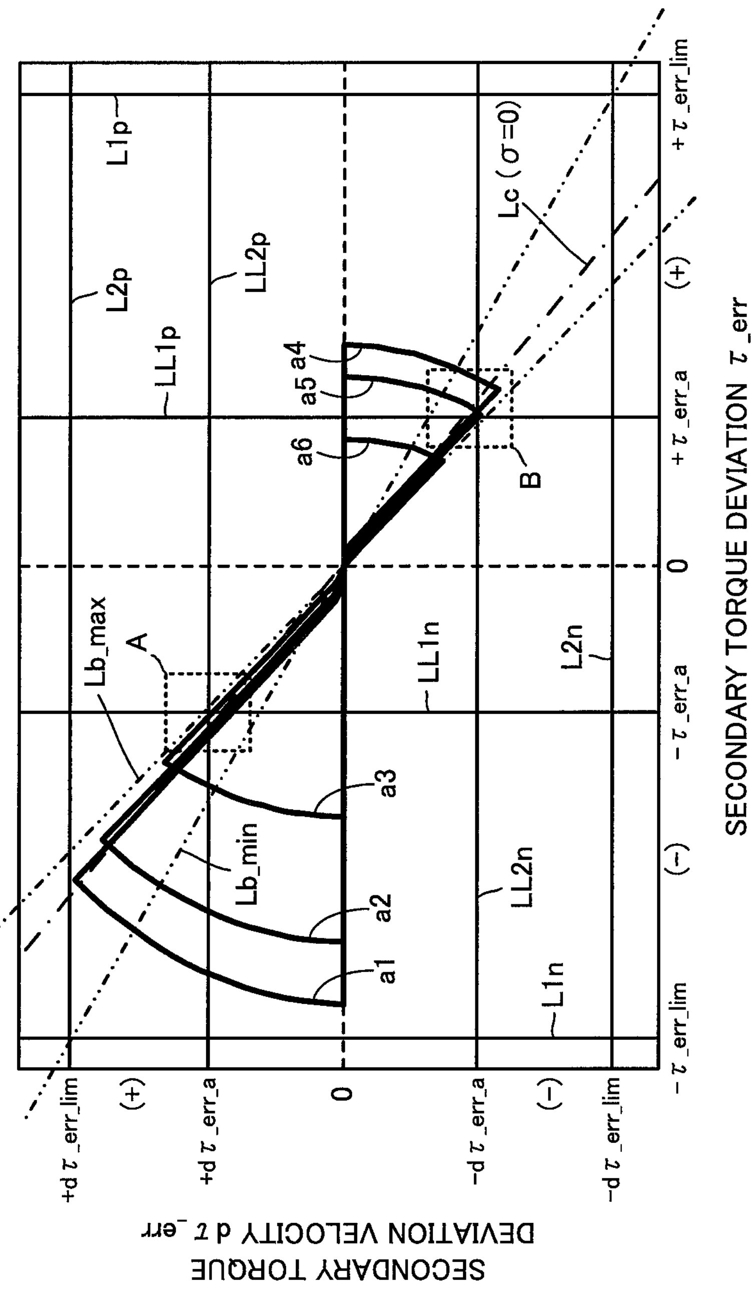
FIG. 3 is a graph for explaining a determination processing of a gradient of the switching hyperplane.

FIG. 3 shows a few representative examples of the response characteristics data created as explained above. Each of the trajectories allotted with references a1 through a6 in FIG. 3 shows an example of the response characteristics data.

(Procedure 2)

Subsequently, from a plurality of the response characteristics data created as explained above, a response characteristics data satisfying a predetermined requirement is selected as a specific response characteristics data for determining the gradient of the switching hyperplane σ=0 (hereinafter referred to as a response characteristics data for determining gradient).

The response characteristics data for determining gradient selected herein is a response characteristics data satisfying a selection requirement 1 and a selection requirement 2 described below. The selection requirement 1 is a requirement that a magnitude (an absolute value) of the value of the secondary torque deviation τ_err on a trajectory indicated by the response characteristics data for determining gradient becomes a magnitude equal to or smaller than a predetermined first permissible limit value τ_err_lim, and also a magnitude (an absolute value) of the value of the secondary torque deviation velocity dτ_err on the trajectory becomes a magnitude equal to or smaller than a predetermined secondary permissible limit value dτ_err_lim.

The selection requirement 2 is a requirement that, in a phase plane taking τ_err and dτ_err as the two coordinate axis components, the trajectory intersects either of a line in which a magnitude (an absolute value) of the value of τ_err coincides with a preliminarily set first set value τ_err_a (a line indicated by a formula τ_err=+τ_err_a or τ_err=−τ_err_a in the phase plane), or a line in which a magnitude (an absolute value) of the value of dτ_err coincides with a preliminarily set second set value dτ_err_a (a line represented by a formula dτ_err=+dτ_err_a or dτ_err=−dτ_err_a in the phase plane).

The selection requirement 1 is, stated otherwise, a requirement that the value of τ_err and dτ_err in an arbitral point on the trajectory indicated by the response characteristics data satisfy the condition that −τ_err_lim≤τ_err≤+τ_err_lim and also −τ_err_lim≤dτ_err≤dτ_err_lim.

Further, the above-mentioned selection requirement 2 is, stated otherwise, a requirement that at least one point that satisfies |τ_err|=|τ_err_a| or |dτ_err|=|dτ_err_a| exists on the trajectory indicated by the response characteristics data.

In the procedure 2, specifically, first, the first permissible limit value τ_err_lim (>0) and the secondary permissible limit value dτ_err_lim (>0) related to the selection requirement 1 are determined (procedure 2-1).

The first permissible limit value τ_err_lim means the permissible limit value of the magnitude of the value of the secondary torque deviation τ_err, and the secondary permissible limit value dτ_err_lim means the permissible limit value of the magnitude of the value of the secondary torque deviation velocity dτ_err.

If the magnitude of τ_err is too large, when it is attempted to control the output torque of the electric motor 5 to converge τ_err to zero, there are cases where the rotational angular velocity or the rotational angular acceleration of the drive pulley 2 (the primary element) exceeds respective permissible limit values. The first permissible limit value τ_err_lim is a limit value of the magnitude of τ_err so as to avoid the rotational angular velocity and the rotational angular acceleration of the drive pulley 2 (the primary element) from exceeding respective permissible limit values.

The respective permissible limit values of the rotational angular velocity and the rotational angular acceleration of the drive pulley 2 are values preliminary set by design, from capacity of the electric motor 5, or under conditions of machine restrictions of the power transmission device 1 and the like. The value may include an allowance of a certain margin with respect to the actual permissible limit value.

In the present embodiment, the first permissible limit value τ_err_lim is determined as follows, according to a permissible limit value ω1_lim of the rotational angular velocity of the drive pulley 2 (hereinafter referred to as a primary velocity limit value $\omega 1\_lim$), a permissible limit value $d\omega 1\_lim$ of the rotational angular acceleration of the drive pulley 2 (hereinafter referred to as a primary acceleration limit value $d\omega 1\_lim$), and the elastic deformation coefficient Ksp of the wire 4.

A change amount of the between-pulley rotational angular difference necessary for converging the secondary torque deviation $\tau\_err$ from an initial state in which the value thereof is $\tau\_err\_0$ ($\neq 0$) to zero is $\tau\_err\_0/Ksp$.

Figure 4A:
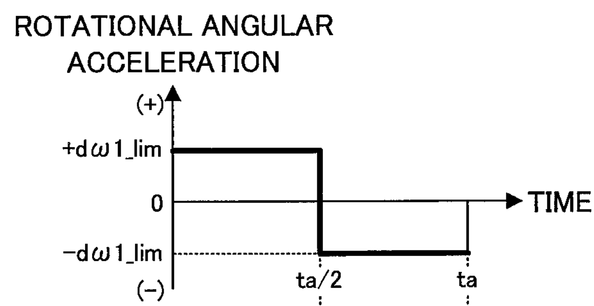
FIG. 4A through FIG. 4C are graphs for explaining the determination processing of the gradient of the switching hyperplane.
Figure 4B:
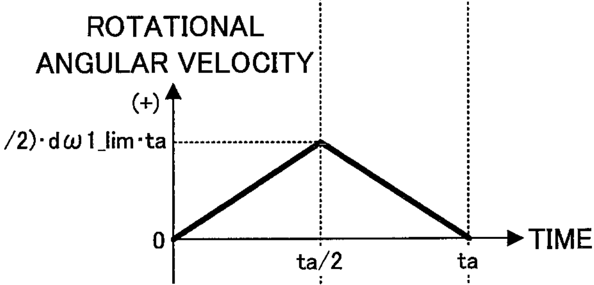
Figure 4C:
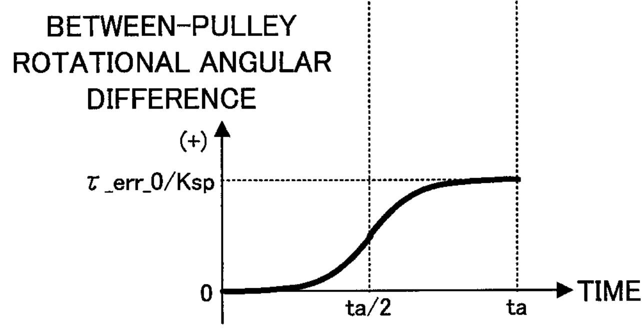
Figure 5A:
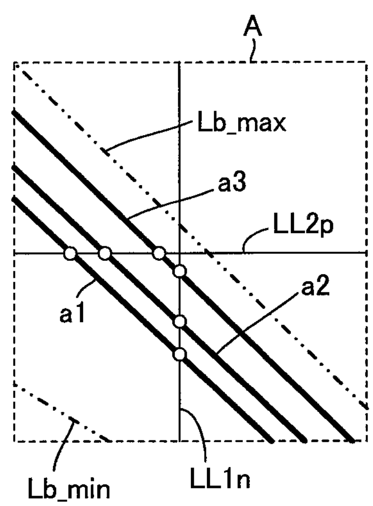
FIG. 5A is an enlarged view of portion A in FIG. 3.
Figure 5B:
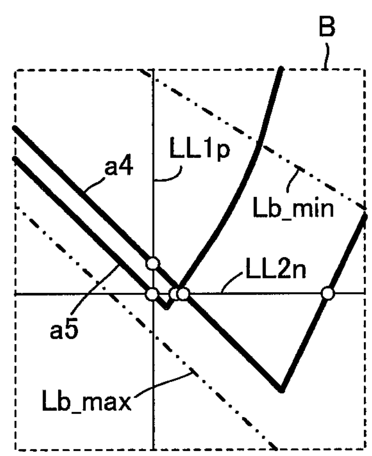
FIG. 5B is an enlarged view of portion B in FIG. 3.

As is shown in FIG. 4C, a time necessary for changing the between-pulley rotational angular difference by $\tau\_err\_0/Ksp$ is represented by ta. And, for example as is shown in FIG. 4A, a case is assumed in which the drive pulley 2 is made to relatively rotate with respect to the driven pulley 3 so as to accelerate the drive pulley 2 at the rotational angular acceleration in the positive direction having the magnitude of the primary acceleration limit value $d\omega 1\_lim$, in the first half of the time ta (a period from 0 to ta/2), and in which the drive pulley 2 is made to relatively rotate with respect to the driven pulley 3 so as to decelerate the drive pulley 2 at the rotational angular acceleration in a negative direction having the magnitude of the primary acceleration limit value $d\omega 1\_lim$, in the latter half of the time ta (a period from ta/2 to ta).

Stated otherwise, a case is assumed in which the acceleration and deceleration of the rotational angular velocity of the drive pulley 2 is sequentially performed at the rotational angular acceleration of the magnitude of the primary acceleration limit value $d\omega 1\_lim$, so as to relatively rotate the drive pulley 2 by the rotational angle of $\tau\_err\_0/Ksp$ with respect to the driven pulley 3, and the relative rotation of the drive pulley 2 with respect to the driven pulley 3 is stopped when the relative rotational angle of the drive pulley 2 with respect to the driven pulley 3 reached $\tau\_err\_0/Ksp$.

In this case, the relationship between $\tau\_err\_0/Ksp$ and $d\omega 1\_lim$ and to is represented by following expression (11).

$$(1/4)\cdot d\omega 1\_lim\cdot ta^2=\tau\_err\_0/Ksp \qquad (11)$$

A maximum rotational angular velocity of the drive pulley 2 in this case is, as is shown in FIG. 4B, $(1/2)\cdot d\omega 1\_lim\cdot ta$, so that it is necessary for a condition of following expression (12) to be satisfied.

$$(1/2)\cdot d\omega 1\_lim\cdot ta\leq\omega 1\_lim \qquad (12)$$

From the above-mentioned expression (11) and expression (12), a condition of following expression (13) with respect to a magnitude (an absolute value) of $\tau\_err\_0$ is obtained.

$$|\tau\_err\_0|\leq(\omega 1\_lim^2/d\omega 1\_lim)\cdot Ksp \qquad (13)$$

As such, in the present embodiment, the first permissible limit value $\tau\_err\_lim$, which is the permissible limit value of the magnitude of the value of the secondary torque deviation $\tau\_err$, is determined by following expression (14).

$$\tau\_err\_lim=(\omega 1\_lim^2/d\omega 1\_lim)\cdot Ksp \qquad (14)$$

$\tau\_err\_lim$ thus determined becomes a large value as the elastic deformation coefficient Ksp becomes larger. $\tau\_err\_lim$ may be a value slightly smaller than the value determined by expression (14).

Further, if the magnitude of the secondary torque deviation velocity $d\tau\_err$ is too large, when it is attempted to control the output torque of the electric motor 5 so as to converge the secondary torque deviation $\tau\_err$ to zero, oscillation of a power transmission system from the electric motor 5 to the driven pulley 3 tends to generate, by a resonance phenomenon induced by the natural oscillation of the power transmission system. The secondary permissible limit value $d\tau\_err\_lim$ is a limit value of the magnitude of $d\tau\_err$ in order to avoid generation of such oscillation.

In this case, when a natural frequency (a natural frequency in a dimension of an angular frequency) of the power transmission system from the electric motor 5 to the driven pulley 3 is set as $\omega vb$, the secondary torque change speed $d\tau\_vb$ when the rotational angle of the drive pulley 2 in the natural frequency $\omega vb$ oscillates relatively with respect to the driven pulley 3 is obtained by following expression (15).

$$d\tau\_vb=Ksp\cdot\omega vb \qquad (15)$$

Therefore, in the present embodiment, the secondary permissible limit value $d\tau\_err\_lim$, which is the permissible limit value of the magnitude of the value of the secondary torque deviation velocity $d\tau\_err$, is determined by following expression (16).

$$d\tau\_err\_lim=Ksp\cdot\omega vb \qquad (16)$$

$d\tau\_err\_lim$ determined as such becomes a larger value as the elastic deformation coefficient Ksp becomes larger.

In this case, the value of the natural frequency $\omega vb$ may be specified, for example, based on experiments and measurements. Alternatively, the value of $\omega vb$ may be determined approximately by following expression (17).

$$\omega vb=\mathrm{sqrt}(Ksp/(Iin+Iout)) \qquad (17)$$

In the expression (17), sqrt( ) is a square root function. Further, Iin is an inertia of a system on the drive pulley 2 side (in this case, a system configured by the drive pulley 2, the reducer 7, and the electric motor 5), and Iout is an inertia of a system on the driven pulley 3 side (in this case, a system configured by the driven pulley 3 and the load member 6), of the power transmission device 1.

The secondary permissible limit value $d\tau\_err\_lim$ may be determined to a value slightly smaller than the value determined by the expression (16).

In the phase plane of FIG. 3, examples of lines on a positive side and a negative side (lines respectively represented by formula $\tau\_err=+\tau\_err\_lim$ and formula $\tau\_err=-\tau\_err\_lim$) that are defined by the first permissible limit value $\tau\_err\_lim$ are lines L1p, L1n, and examples of lines on a positive side and a negative side (lines respectively represented by formula $d\tau\_err=+d\tau\_err\_lim$ and formula $d\tau\_err=-d\tau\_err\_lim$) that are defined by the secondary permissible limit value $d\tau\_err\_lim$ are lines L2p, L2n.

In the procedure 2, subsequently, the first set value $\tau\_err\_a$ (>0) and the second set value $d\tau\_err\_a$ (>0) related to the selection requirement 2 are determined (procedure 2-2)

The first set value $\tau\_err\_a$ is a value between zero and the first permissible limit value $\tau\_err\_lim$ (a value that becomes $0<\tau\_err\_a<\tau\_err\_lim$), and is determined according to the first permissible limit value $\tau\_err\_lim$ so as not to approach too close to zero. For example, $\tau\_err\_a$ is determined to a value which is Ma1 times $\tau\_err\_lim$ ($=Ma1\cdot\tau\_err\_lim$). However, Ma1 is a positive constant smaller than 1, and is a value for example in a range such as 0.25 to 0.75.

Similarly, the second set value $d\tau\_err\_a$ is a value between zero and the secondary permissible limit value $d\tau\_err\_lim$ (a value that becomes $0<d\tau\_err\_a<d\tau\_err\_lim$), and is determined according to the secondary permissible limit value $d\tau\_err\_lim$ so as not to approach too close to zero. For example, $d\tau\_err\_a$ is determined to a value which is Ma2 times $d\tau\_err\_lim$ ($=Ma2\cdot d\tau\_err\_lim$). However, Ma2 is a positive constant smaller than 1, and is a value for example in a range such as 1/4 through 1/6.

In the phase plane of FIG. 3, examples of lines on a positive side and a negative side (lines respectively represented by formula $\tau\_err=-\tau\_err\_a$ and formula $\tau\_err=-\tau\_err\_a$) that are defined by the first set value $\tau\_err\_a$ are lines LL1p, LL1n, and lines on a positive side and a negative side (lines respectively represented by formula $d\tau\_err=+d\tau\_err\_a$ and formula $d\tau\_err=-d\tau\_err\_a$) that are defined by the second set value $d\tau\_err\_a$ are lines LL2p, LL2n.

In procedure 2, subsequently, the response characteristics data for determining gradient that satisfies the above-mentioned selection requirements 1, 2 is selected, using the first permissible limit value $\tau\_err\_lim$ and the secondary permissible limit value $d\tau\_err\_lim$, and the first set value $\tau\_err\_a$ and the second set value $d\tau\_err\_a$, that are determined as is explained above (procedure 2-3).

For example, in the example shown in FIG. 3, the response characteristics data allotted with references a1 through a6, each satisfy the selection requirement 1. On the other hand, the response characteristics data allotted with references a1 through a5, each satisfy the selection requirement 2, but the response characteristics data allotted with reference a6 does not satisfy the selection requirement 2.

Therefore, the response characteristics data excluding the response characteristics data of a6 (the response characteristics data of a1 through a5) is selected as the response characteristics data for determining gradient.

As is explained above, the response characteristics data for determining gradient is selected in procedure 2.

(Procedure 3)

Subsequently, among the intersections between a trajectory of the response characteristics data for determining gradient selected as explained above, and lines LL1p, LL1n, LL2p, and LL2n that are represented respectively by the first set value $\tau\_err\_a$ and the second set value $d\tau\_err\_a$, the intersection satisfying a predetermined requirement condition related to the intersection (hereinafter referred to as an intersection requirement condition) is used to determine the gradient of the switching hyperplane $\sigma=0$.

The intersection requirement condition is a condition that a gradient of a line connecting the intersection and an origin of the phase plane (a point that becomes $\tau\_err=0$, $d\tau\_err=0$) is within a preliminarily determined gradient requirement range.

As is explained above, the gradient of the switching hyperplane $\sigma=0$ is for defining the time constant Tc of the convergent response of $\tau\_err$ on the switching hyperplane $\sigma=0$. And the above-mentioned gradient requirement range is a requirement range of the gradient of the switching hyperplane $\sigma=0$ corresponding to a requirement range of the time constant Tc.

In a case of structuring a system which controls the secondary torque $\tau$ to a desired value (the desired secondary torque $\tau\_cmd$) in the power transmission device 1, usually, there is a requirement (desire) from design to set the time constant Tc of the convergent response of the secondary torque $\tau$ to a value within a certain range. Therefore, the gradient requirement range is set, for example, corresponding to the requirement range from design of the value of the time constant Tc.

In this case, in a case where the requirement range from design of the value of the time constant Tc is set to a range of $Tc\_L \leq Tc \leq Tc\_H$, and a relationship between the gradient of the switching hyperplane $\sigma=0$ and the time constant Tc is set to gradient$=-1/Tc$, then the gradient requirement range should be set to a range of $-(1/Tc\_L) \leq$ gradient $\leq -(1/Tc\_H)$.

Further, in a case where the relationship between the gradient of the switching hyperplane $\sigma=0$ and the time constant Tc is set to gradient$=-Tc$, then the gradient requirement range should be set to a range of $-Tc\_H \leq$ gradient $\leq -Tc\_L$.

However, the rotational angular acceleration of the drive pulley 2 must be limited to a magnitude equal to or smaller than the above-mentioned primary acceleration limit value $d\omega1\_lim$ Therefore, the value of the time constant Tc cannot be made small with no limitation.

More specifically, a value of the time constant Tc of the convergent response in a case where the magnitude of the secondary torque deviation $\tau\_err$ is converged to zero, from the initial state in which $\tau\_err$ coincides with the first permissible limit value $\tau\_err\_lim$ by relatively rotating the drive pulley 2 with respect to the driven pulley 3 at the rotational angular acceleration of a magnitude of the primary acceleration limit value $d\omega1\_lim$, as is shown in FIGS. 4A through 4C, is set to Tcx.

At this time, the time constant Tc of the convergent response of $\tau\_err$ when the magnitude of the secondary torque deviation $\tau\_err$ in the initial state is the first permissible limit value $\tau\_err\_lim$ cannot be made smaller than Tcx (hereinafter referred to as a specific time constant Tcx).

Therefore, the gradient of the switching hyperplane $\sigma=0$ needs to be determined so as to satisfy a constraint condition (hereinafter referred to as a time constant constraint condition) that the time constant Tc corresponding thereto becomes a value equal to or more than the specific time constant Tcx.

In a case where the magnitude of the secondary torque deviation $\tau\_err$ is converged to zero, from the initial state in which $\tau\_err$ coincides with the first permissible limit value $\tau\_err\_lim$ by relatively rotating the drive pulley 2 with respect to the driven pulley 3 at the rotational angular acceleration of a magnitude of the primary acceleration limit value $d\omega1\_lim$, as is shown in FIGS. 4A through 4C, the time ta required for the convergence is set to tax, then the relationship between tax and the desired time constant Tcx is approximately represented by following expression (18).

$$Tcx=tax/3 \tag{18}$$

Further, tax is a value of ta when $\tau\_err\_0$ in above-mentioned expression (11) is substituted by $\tau\_err\_lim$, so that following expression (19) stands.

$$(1/4)\cdot d\omega1\_lim\cdot tax^2=\tau\_err\_lim/Ksp \tag{19}$$

From above-mentioned expressions (18), (19), following expression (20) is obtained.

$$Tcx=(2/3)\cdot \mathrm{sqrt}((\tau\_err\_lim/d\omega1\_lim)/Ksp) \tag{20}$$

Therefore, in the present embodiment, the time constant Tc corresponding to the gradient of the switching hyperplane $\sigma=0$ being equal to or more than the specific time constant Tcx calculated by above-mentioned expression (20) ($Tc \geq Tcx$) is set as the time constant constraint condition. Further, the gradient requirement range of the switching hyperplane $\sigma=0$ is set within the range satisfying the time constant constraint condition.

In this case, in the case where a lower limit value Tc_L of the design requirement range of the value of the time constant Tc satisfies the above time constant constraint condition (in the case where $Tc\_L \geq Tcx$), the gradient requirement range of the switching hyperplane $\sigma=0$ is set to a range of $Tc\_L \leq Tc \leq Tc\_H$, corresponding to the requirement range of the time constant Tc. For example, in the case where the relationship between the gradient of the switching hyperplane $\sigma=0$ and the time constant Tc is a relationship that gradient$=-1/Tc$, then the gradient requirement range is set to a range of $-(1/Tc\_L) \leq$ gradient $\leq -(1/Tc\_H)$.

Further, in the case where the lower limit value Tc_L of the design requirement range of the value of the time constant Tc does not satisfy the time constant constraint condition (in the case where $Tc\_L<Tcx$), the gradient requirement range of the switching hyperplane $\sigma=0$ is set to a range of $Tcx \leq Tc \leq Tc\_H$, corresponding to the requirement range of the time constant Tc. For example, in the case where the relationship between the gradient of the switching hyperplane $\sigma=0$ and the time constant Tc is gradient$=-1/Tc$, then the gradient requirement range is set to a range of $-(1/Tcx) \leq$ gradient $\leq -(1/Tc\_H)$.

The intersection requirement condition in procedure 3 is a condition that the gradient of the line connecting the intersection and the origin of the phase plane is within the gradient requirement range preliminarily determined as is explained above.

In the phase plane of FIG. 3, lines Lb_max, Lb_min that are represented by a two-dot-and-dash line represent examples of a line with a gradient of maximum magnitude and a line with a gradient with a minimum magnitude, in the gradient requirement range determined as explained above. In this case, in the phase plane of FIG. 3, a relationship that gradient$=-1/Tc$ holds, so that the magnitude of the gradient of the line Lb_max is $1/\max(Tc\_L, Tcx)$, and the magnitude of the gradient of the line Lb_min is $1/Tc\_H$. Here, $\max(Tc\_L, Tcx)$ is a function meaning a larger value of Tc_L and Tcx.

In the procedure 3, an intersection satisfying the intersection requirement condition defined by the gradient requirement range is extracted. For example, in the example shown in FIG. 3, intersections of white circles indicated in FIG. 5A, which is an enlarged view of dashed frame portion A in FIG. 3, and intersections of white circles indicated in FIG. 5B, which is an enlarged view of dashed frame portion B in FIG. 3, are extracted as the intersections satisfying the intersection requirement condition.

Thereafter, using a set of the values of $\tau\_err$ and $d\tau\_err$ in a plurality of the extracted intersections, a gradient coinciding or approximating as much as possible with a gradient of the line connecting each intersection and the origin, is calculated by a least squares method. The calculated gradient is determined as the gradient of the switching hyperplane $\sigma=0$.

For example, in the example shown in FIG. 3, a gradient of a line Lc indicated by a dot-and-dash line in the figure is determined as the gradient of the switching hyperplane $\sigma=0$.

The gradient of the switching hyperplane $\sigma=0$ may be determined by a statistical identification approach other than the least squares method. For example, a mean value of the gradients of the lines connecting each intersection satisfying the intersection requirement condition and the origin may be determined as the gradient of the switching hyperplane $\sigma=0$.

(Procedure 4)

Subsequently, based on the gradient of the switching hyperplane $\sigma=0$ determined in (Procedure 3) as is explained above, the values of the coefficient components s1, s2 of the switching function $\sigma$ are determined Specifically, gradient$=-s1/s2$ (or $-s2/s1$), so that the values of s1, s2 are determines such that $-s1/s2$ (or $-s2/s1$) coincides with the gradient of the switching hyperplane $\sigma=0$ determined in (Procedure 3). In this case, the value of either of s1, s2 may be an arbitral value of constant (for example, 1).

In the case where the value of one of s1, s2 is a value of constant, the value of the other is set unambiguously according to the gradient of the switching hyperplane $\sigma=0$. For example, in the case where gradient$=-s1/s2$, and in the case where the value of the coefficient component s2 is "1", then the value of s1 becomes a value $(-1)$ times the gradient. Therefore, in the case where the value of either s1, s2 is a value of constant, then procedure 4 may practically be omitted.

The above is the determination method of the values of the coefficient components s1, s2 of the switching function $\sigma$ of the present embodiment.

To supplement, the procedure 1 corresponds to a first step of the present invention, and the procedures 2, 3 correspond to a second step of the present invention.

In the present embodiment, the gradient requirement range defining the intersection requirement condition in procedure 3 is set reflecting the time constant constraint condition. However, the gradient requirement range may be determined simply according to requirement range from design of the time constant Tc, without taking the time constant constraint condition into consideration.

In this case, the gradient of the switching hyperplane $\sigma=0$ is provisionally determined by methods such as the least squares method, similarly to the above, based on the intersections satisfying the intersection requirement condition defined by the gradient requirement range. Thereafter, in the case where the value of the time constant Tc defined by the provisional gradient satisfies the time constant constraint condition, then the provisional gradient itself may be determined as the gradient of the switching hyperplane $\sigma=0$.

Further, in the case where the value of the time constant Tc defined by the provisional gradient does not satisfy the time constant constraint condition, the gradient of the switching hyperplane $\sigma=0$ may be determined using the intersections satisfying the intersection requirement condition defined by the gradient requirement range in which the time constant constraint condition is reflected as is explained above.

Subsequently, explanation will be given on the operation of the control device 10 when controlling the output torque of the electric motor 5 so as to make the secondary torque $\tau$ of the power transmission device 1 follow the desired secondary torque $\tau\_cmd$.

In the following explanation, a suffix "_act" will be attached to references indicating an actual value of an arbitral state amount (angle, torque and the like), or an observed value (a detected value or an estimated value) thereof.

Figure 6:
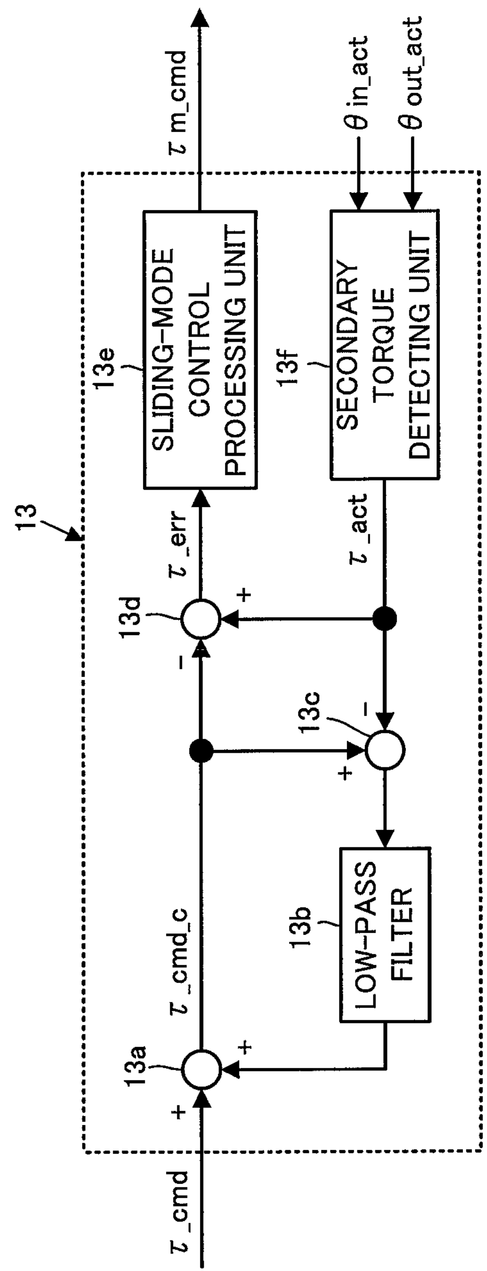
FIG. 6 is a block diagram showing a processing of a control input determining unit of a control device shown in FIG. 1.

In the present embodiment, the control device 10 sequentially determines the desired torque $\tau m\_cmd$ of the electric motor 5 as the control input, with the control input determining unit 13 executing the process indicated by a block diagram of FIG. 6.

In each control processing cycle of the control device 10, the control input determining unit 13 is sequentially input with the actual rotational angle $\theta in\_act$ (detected value) of the drive pulley 2 respectively indicated by the output signals (detection signals) of the angle detectors 11, 12, and the actual rotational angle $\theta out\_act$ (detected value) of the driven pulley 3, and is also sequentially input with the desired secondary torque $\tau\_cmd$.

Thereafter, the control input determining unit 13 calculates an estimated value of the actual secondary torque $\tau\_act$, by a secondary torque detecting unit 13*f*, by performing the calculation of the right side of the expression (1), using the values (current values) of $\theta in\_act$, $\theta out\_act$ in the current control processing cycle, and a value of the elastic deformation coefficient Ksp of the wire 4 (preset value memorized and held in a memory not shown).

Further, the control input determining unit 13 corrects $\tau\_cmd$, by adding an output value of a low-pass filter 13*b* to the input desired secondary torque $\tau\_cmd$ (current value) in a calculating unit 13*a*. Hereinafter, $\tau\_cmd$ after correction will be referred to as a corrected desired secondary torque $\tau\_cmd\_c$.

This correction is a correction for compensating an influence of an offset component (a steady error component)

included in the secondary torque $\tau$_act. In this case, the low-pass filter 13*b* is sequentially input with output values of the calculation result of the calculating unit 13*c*.

The calculating unit 13*c* calculates a difference between the value (a previous value) of the corrected desired secondary torque $\tau$_cmd_c calculated by the calculating unit 13*a* in a previous control processing cycle, and an estimated value (a current value) of the secondary torque $\tau$_act calculated by the secondary torque detecting unit 13*f* in the current control processing cycle.

Thereafter, the low-pass filter 13*b* performs a filtering process of a low-pass characteristics to the output value of the calculation result of the calculating unit 13, so as to extract the offset component. The offset component is output from the low-pass filter 13*b* to the calculating unit 13*a*.

Subsequently, the control input determining unit 13 calculates a deviation between the value (current value) of the corrected desired secondary torque $\tau$_cmd_c calculated by the calculating unit 13*a* and the estimated value (current value) of the secondary torque $\tau$_act calculated by the secondary torque detecting unit 13*f*, that is, the secondary torque deviation $\tau$_err, by a calculating unit 13*d*.

Thereafter, the control input determining unit 13 sequentially inputs the secondary torque deviation $\tau$_err to a sliding-mode control processing unit 13*e*.

The sliding-mode control processing unit 13*e* calculates the value of the switching function $\sigma$ according to expression (7). Further, the sliding-mode control processing unit 13*e* sequentially calculates the desired torque $\tau$m_cmd of the electric motor 5 as the control input, by performing the calculation of the right side of expression (6) using the calculated value of the switching function 6.

In this case, the secondary torque deviation velocity d$\tau$_err necessary for the calculation of expression (7) is calculated as a temporal change rate of the secondary torque deviation $\tau$_err input to the sliding-mode control processing unit 13*e*. Further, the values of the coefficient components s1, s2 are preset values preliminarily determined as is explained above, and are memorized and held in a memory not shown.

Further, each component of A, B necessary for the calculation of expression (6) are preset values determined based on the definitional expression of the where clause of expression (4). The preset values are memorized and stored in a memory not shown.

The control input determining unit 13 sequentially determines the desired torque $\tau$m_cmd of the electric motor 5 (the control input) by the above-mentioned processing.

In the case where the offset component (the steady error component) included in the secondary torque $\tau$_act is sufficiently small, then the calculation units 13*a*, 13*c* and the low-pass filter 13*b* may be omitted and $\tau$_cmd may be input to the calculation unit 13*d* as it is.

The control device 10 inputs the desired torque $\tau$m_cmd sequentially determined by the control input determining unit 13 as is explained above into the motor control unit 14, and executes the processing of the motor control unit 14. The motor control unit 14 determines a command value (desired value) of the energization current of an armature winding not shown of the electric motor 5, according to the input desired torque $\tau$_cmd. Thereafter, the motor control unit 14 feedback controls the energization current of the armature winding so as to coincide the actual energization current to the determined command value.

By doing so, the actual output torque of the electric motor 5 is controlled to the desired torque $\tau$m_cmd. Consequently, the actual secondary torque $\tau$_act is controlled so as to follow the desired secondary torque $\tau$_cmd.

In the embodiment explained above, the gradient of the switching hyperplane $\sigma$=0 for the sliding-mode control for the control of the secondary torque $\tau$ by the control device 10 is determined using the response characteristics data for determining gradient satisfying the selection requirements 1, 2, among a plurality of the response characteristics data created using a versatile control method such as the PD control law.

In this case, the response characteristics data for determining gradient is an appropriate data capable of satisfying a condition that the magnitude of the rotational angular acceleration and the rotational angular velocity of the drive pulley 2 do not exceed the respective allowable limit values, that is, the primary acceleration limit value d$\omega$1_lim and the primary velocity limit value $\omega$1_lim, by satisfying the selection requirement 1.

Further, the trajectory of the response characteristics data may be the one generating oscillation at a region near the origin of the phase plane. However, the response characteristics data for determining gradient is a data including a set of the values of the secondary torque deviation $\tau$_err and the secondary torque deviation velocity d$\tau$_err the magnitude thereof not being minute in the vicinity of zero, by satisfying the selection requirement 2.

Thereafter, the gradient of the switching hyperplane $\sigma$=0 is determined by a method such as the least squares method, based on the intersection satisfying the intersection requirement condition corresponding to the requirement range of the time constant Tc, among the intersections between any one of the lines LL1p, LL1n in which the magnitude of the value of $\tau$_err becomes the first set value $\tau$_err_a and the lines LL2p, LL2n in which the magnitude of d$\tau$_err becomes the second set value d$\tau$_err_a, and the trajectories of the response characteristics data for determining gradient satisfying the selection requirements 1, 2.

In this case, the magnitude of the value of the secondary torque deviation $\tau$_err at the intersection (=the first set value $\tau$_err_a) has a magnitude of a certain extent that is smaller than the first permissible limit value $\tau$_err_lim and not too close to zero. Similarly, the magnitude of the value of the secondary torque deviation velocity d$\tau$_err in the intersection (=the second set value $\tau$_err_a) has a magnitude of a certain extent that is smaller than the secondary permissible limit value d$\tau$_err_lim and is not too close to zero.

Since the intersection satisfies the intersection requirement condition, it satisfies the requirement from design and the time constant constraint condition related to the time constant Tc.

Accordingly, the intersection used for determining the gradient of the switching hyperplane $\sigma$=0 has high reliability and stability, as a point on the trajectory of the response characteristics data that could favorably converge the secondary torque deviation $\tau$_err to zero. Therefore, by determining the gradient of the switching hyperplane $\sigma$=0 using the intersection, the gradient is determined so as to favorably converge the secondary torque deviation $\tau$_err to zero.

Further, the response characteristics data may be obtained using a versatile control method, so that numerous response characteristics data may be effectively and easily collected. Consequently, the determination of the favorable gradient of the switching hyperplane $\sigma$=0 may be performed efficiently.

Further, in the processing of the control input determining unit 13 of the control device 10, the control input (the desired torque $\tau$m_cmd of the electric motor 5) is determined by the processing of the sliding-mode control using the switching hyperplane $\sigma$=0 having the gradient (and consequently the values of the coefficient components s1, s2) determined as explained above. As such, the control of the secondary torque $\tau$ may be performed appropriately so as to realize required convergence characteristics and high robustness.

Specifically, in the present embodiment, the gradient of the switching hyperplane $\sigma=0$ (and consequently the time constant Tc corresponding to the gradient) is set so as to satisfy the time constant constraint condition. Therefore, the control of the secondary torque $\tau$ may be performed with high robustness in a wide operating range of the power transmission device 1.

A corresponding relationship between the present embodiment explained above and the present invention will be supplemented. The drive pulley 2, the driven pulley 3, the wire 4, and the electric motor 5 respectively correspond to a primary element, a secondary element, an elastic deformation member, and an actuator of the present invention. Further, the rotation of the drive pulley 2 corresponds to a displacement of the primary element of the present invention, the secondary torque $\tau$ corresponds to a secondary power of the present invention, and the elastic deformation coefficient Ksp corresponds to an elastic deformation coefficient of the present invention.

Further, the control input determining unit 13 of the control device 10 corresponds to a control input determining unit of the present invention.

Further, the secondary torque deviation $\tau$_err, and the secondary torque deviation velocity d$\tau$_err correspond respectively to a first variable component and a second variable component of the present invention. Also, the first permissible limit value $\tau$_err_lim, the second permissible limit value d$\tau$_err_lim, the first set value $\tau$_err_a, the second set value d$\tau$_err_a of the present embodiment correspond respectively to a first permissible limit value, a second permissible limit value, a first set value, and a second set value of the present invention.

Further, the lines LL1p, LL1n correspond to a first set value line of the present invention, and the lines LL2p, LL2n correspond to a second set value line of the present invention. Still further, the specific time constant Tcx correspond to a specific time constant of the present invention.

Second Embodiment

Next, a second embodiment of the present invention will be explained with reference to FIG. 7. In the present embodiment, a part of the processing of the control input determining unit 13 of the control device 10 differs from the first embodiment. Therefore, explanation of the present embodiment will be made mainly for matters differing from the first embodiment, and explanation of matters identical with the first embodiment will be omitted.

In the present embodiment, in order to reduce the influence of disturbance in the processing of the control input determining unit 13, the values of the secondary torque deviation $\tau$_err and the secondary torque deviation velocity d$\tau$_err are sequentially estimated using an observer. Thereafter, in place of the actual secondary torque deviation $\tau$_err_act calculated using the actual secondary torque $\tau$_act (the estimated value by the secondary torque detecting unit **13*f***) as it is, and the actual secondary torque deviation velocity d$\tau$_err_act obtained as the temporal change rate thereof, the control input (the desired torque $\tau$m_cmd) is determined by executing the processing of the sliding-mode control using estimated values $\tau$_err_hat, d$\tau$_err_hat by the observer.

Figure 7:
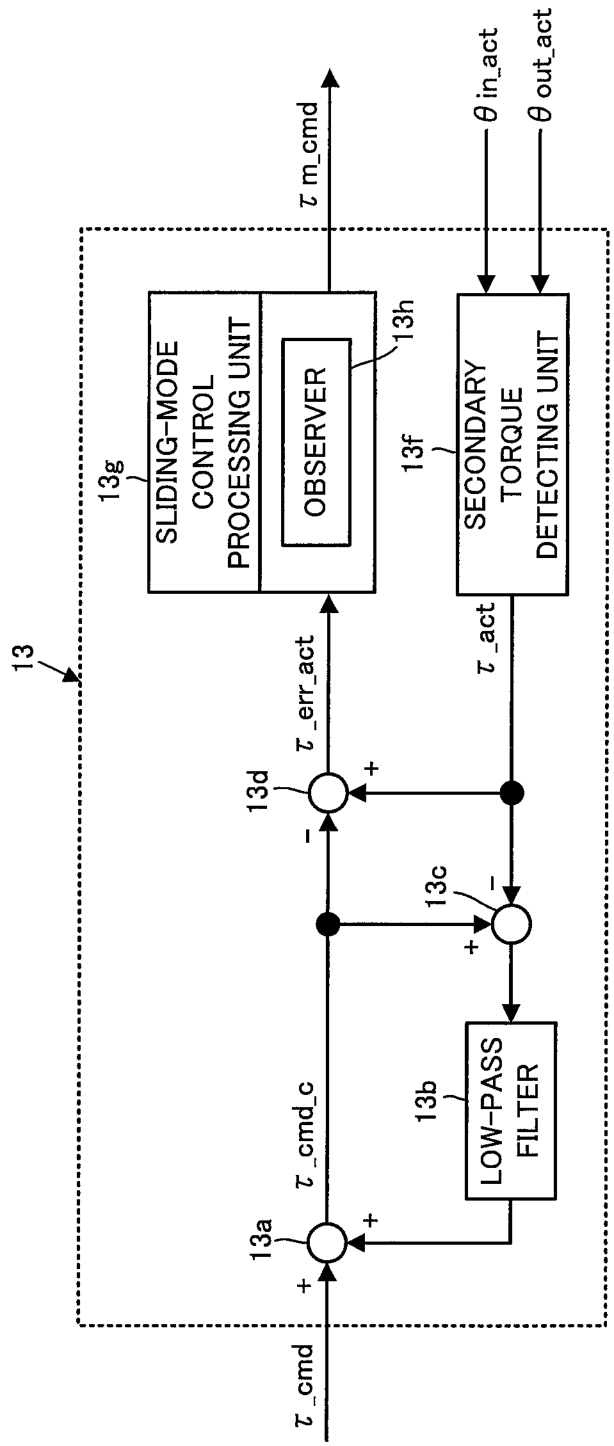
FIG. 7 is a block diagram showing a processing of the control input determining unit according to a second embodiment of the present invention.

Specifically, in the present embodiment, as is shown in FIG. 7, a sliding-mode control processing unit **13*g* of the control input determining unit 13 includes a function as an observer 13*h***.

Thereafter, the sliding-mode control processing unit **13*g* is input with the deviation (an output of a calculating unit 33*d*) between the estimated value of the actual secondary torque $\tau$_act calculated by the secondary torque detecting unit 13*f*** and the corrected desired secondary torque $\tau$_cmd_c, as the actual secondary torque deviation $\tau$_err_act. The calculation processing of the corrected desired secondary torque $\tau$_cmd_c is the same as in the first embodiment.

The observer **13*h* sequentially updates and calculates an estimated value $\tau$_err_hat of the secondary torque deviation $\tau$_err with the disturbance component reduced (hereinafter referred to as a secondary torque deviation estimated value $\tau$_err_hat), and an estimated value d$\tau$_err_hat of the secondary torque deviation velocity d$\tau$_err with the disturbance component reduced (hereinafter referred to as a secondary torque deviation velocity estimated value d$\tau$_err_hat), in the control processing cycle of the control device 10**, by a calculation of following expression (21).

$$\begin{bmatrix} \tau\_\text{err\_hat}(n) \\ d\tau\_\text{err\_hat}(n) \end{bmatrix} = A\cdot\begin{bmatrix} \tau\_\text{err\_hat}(n-1) \\ d\tau\_\text{err\_hat}(n-1) \end{bmatrix} + B\cdot u(n-1) + Kobs\cdot\left(\begin{bmatrix} \tau\_\text{err\_act}(n) \\ d\tau\_\text{err\_act\_filt}(n) \end{bmatrix} - \begin{bmatrix} \tau\_\text{err\_hat}(n-1) \\ d\tau\_\text{err\_hat}(n-1) \end{bmatrix}\right) \tag{21}$$

This expression (21) is formed on the premise of the state equation of above-mentioned expression (4), and A, B in expression (21) are respectively a matrix (two-rows, two-columns), and a vector (two-rows, one-column) that are defined by the where clause of expression (4). The values of each component of A, B are predetermined preset values. The present values are memorized and stored in a memory not shown of the control device 10.

In this case, as a value of u(n−1) of the right side of expression (21), the value (previous value) of the desired torque Tm_cmd determined in the previous control processing cycle is used. Further, Kobs is a predetermined preset value. The preset value is memorized and stored in a memory not shown of the control device 10.

Further, d$\tau$_err_act_filt is a value performed with a filtering processing of a low-pass characteristics, to the value of the temporal change rate of the secondary torque deviation $\tau$_err_act input to the sliding-mode control processing unit **13*g***.

Alternatively, a value obtained by removing a noise component from the value of the temporal change rate of the estimated value of the secondary torque deviation $\tau$_err_act by arbitral processing other than the filtering processing of the low-pass characteristics (for example, processing proposed by the Applicant in Japanese Patent Application No. 2011-159322 (Japanese Patent Application Laid-Open No. 2013-22677), and the like), may be used in place of d$\tau$_err_act_filt.

The sliding-mode control processing unit **13*g* of the present embodiment calculates the value of the switching function $\sigma$ using the secondary torque deviation estimated value $\tau$_err_hat and the secondary torque deviation velocity estimated value d$\tau$_err_hat that are calculated by the observer 13*h* as is explained above, according to the expression (7). Further, the sliding-mode control processing unit 13*g* sequentially calculates the desired torque $\tau$m_cmd of the electric motor 5** as the control input using the calculated value of the switching function $\sigma$ and performing the calculation of the right side of the expression (6).

The present embodiment is the same as the first embodiment, other then the matters explained above.

A similar effect as the first embodiment may be obtained by the present embodiment.

In addition, in the present embodiment, the control processing of the sliding mode control is performed using the secondary torque deviation estimated value τ_err_hat and the secondary torque deviation velocity estimated value dτ_err_hat calculated by the observer 13*h*, in place of the actual secondary torque deviation τ_err_act and the secondary torque deviation velocity dτ_err_act as the temporal change rate thereof, that are calculated using the estimated value of the actual the secondary torque τ_act sequentially calculated by the secondary torque detecting unit 13*f* as it is. Therefore, the control input (the desired torque τm_cmd) may be determined while reducing the influence of the disturbance component included in the estimated value of the secondary torque τ_act and the temporal change rate thereof.

Therefore, it becomes possible to further improve the robustness of the control of the secondary torque $\tau$ by the control device 10.

A corresponding relationship between the present embodiment explained above and the present invention will be supplemented. In the present embodiment, the observer 13*h* corresponds to an observer of the present invention. Other than this, the corresponding relationship between the present embodiment and the present invention is the same as in the first embodiment.

Third Embodiment

Subsequently, a third embodiment of the present invention will be explained with reference to FIG. 8 through FIG. 11. The present embodiment differs from the first embodiment in the configuration of a part of the power transmission device, and a part of the control processing. Therefore, explanation of the present embodiment will be mainly on the matters differing from the first embodiment, and the matters identical with the first embodiment will be omitted.

Figure 8:
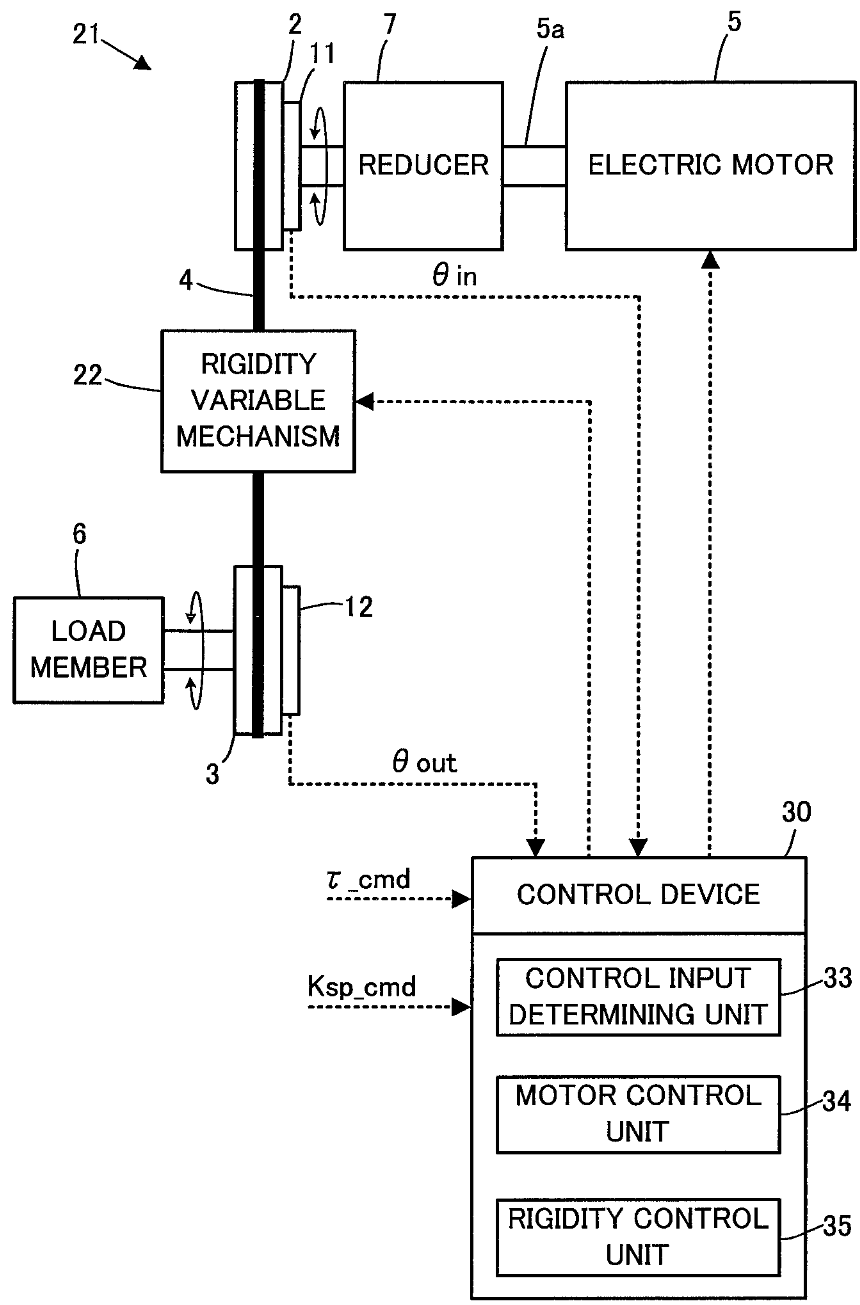
FIG. 8 is a view showing a system configuration in a third embodiment of the present invention.

With reference to FIG. 8, a power transmission device 21 of the present embodiment is equipped with, similarly to the power transmission device 1 of the first embodiment, the drive pulley 2, the driven pulley 3, the wire 4, the electric motor 5, and the load member 6. Further, the power transmission device 21 is configured to rotate and drive the driven pulley 3 together with the load member 6, by transmitting the rotational driving force (torque) imparted to the drive pulley 2 from the output shaft 5*a* of the electric motor 5 via the reducer 7, to the driven pulley 3 via the wire 4 configured from the elastic deformation member.

However, the power transmission device 21 of the present embodiment is further equipped with a rigidity variable mechanism 22 for varying a rigidity of the wire 4 (and consequently the elastic deformation coefficient).

Figure 9:
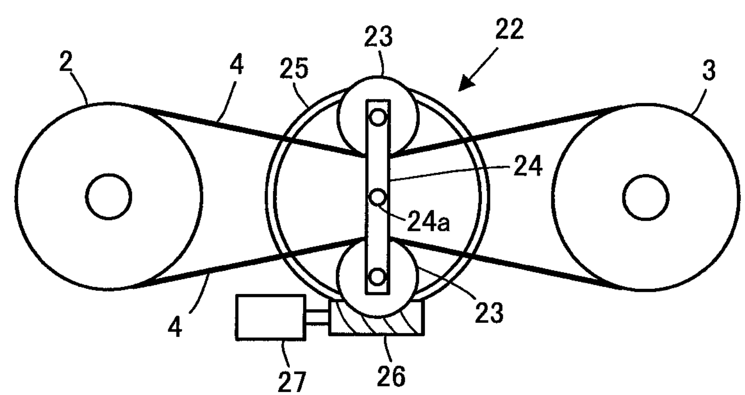
FIG. 9 is a view showing a configuration of a rigidity variable mechanism shown in FIG. 8.
Figure 10:
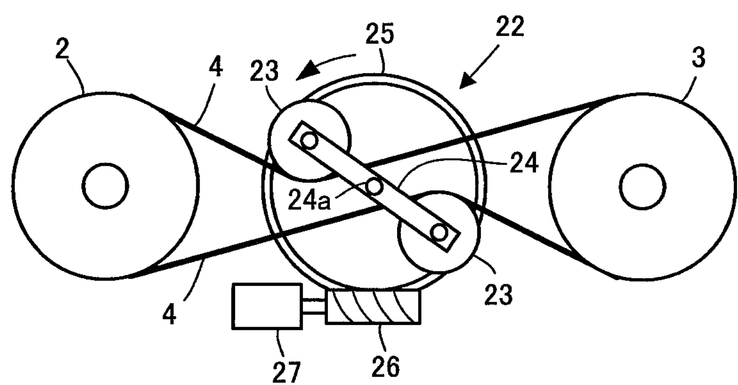
FIG. 10 is a view showing a configuration of the rigidity variable mechanism shown in FIG. 8.

The rigidity variable mechanism 22 is configured, for example as is shown in FIG. 9 and FIG. 10. That is, the rigidity variable mechanism 22 is equipped with a rotational bar 24, in which rollers 23, 23 are pivotally fixed so as to rotate freely at both end portions thereof. The rotational bar 24 is capable of rotating integrally with a rotational axis 24*a* fixed to a central portion of the rotational bar 24. In this case, the rotational axis 24*a* is arranged at a position between the drive pulley 2 and the driven pulley 3, and facing a direction parallel to the rotational shaft center of the pulleys 2, 3.

Rotational shaft centers of respective rollers 23, 23, on both end portions of the rotational bar 24 are facing a direction parallel to the rotational shaft centers of the drive pulley 2 and the driven pulley 3.

Further, the drive pulley 2 and the driven pulley 3 are coupled by two wires 4, 4. These wires 4, 4, are provided so as to have an interval in the direction approximately orthogonal to the interval direction of the pulleys 2, 3, and both ends thereof are fixed to an outer peripheral portion of the drive pulley 2 and an outer peripheral portion of the driven pulley 3, respectively.

Further, among the rollers 23, 23, an outer peripheral portion of an inner end side of one of the roller 23 (a side towards the other roller 23) is press-contacted against one of the wires 4, 4, and an outer peripheral portion of an inner end side of the other roller 23 (a side towards the one of the roller 23) is press-contacted against the other of the wires 4, 4.

Further, the rigidity variable mechanism 22 is equipped with a gear (a spur gear) 25 which is coupled to the rotational bar 24 via the rotational axis 24*a* and is provided so as to be able to rotate integrally with the rotational bar 24, a worm gear 26 meshing with the gear 25, and an electric motor 27 which rotary drives the worm gear 26.

Therefore, by rotationally driving the worm gear 26 with the electric motor 27, the gear 25 rotates integrally with the rotational bar 24.

In this case, accompanying the rotation of the rotational bar 24, each of the rollers 23, 23 rotates (revolves) about the shaft center of the rotational axis 24*a* while maintaining press-contact with the contacting wire 4. Further, for example when the rotational bar 24 rotates from the state shown in FIG. 9 to the state shown in FIG. 10, the wires 4, 4 are biased in a expanding direction.

The wires 4, 4 of the present embodiment are configured from an elastic deformation member having a nature of increasing the rigidity as the same expands. Therefore, in the power transmission device 21 of the present embodiment, the elastic deformation coefficient Ksp (a rate of change of the secondary torque $\tau$ with respect to a change of a between-pulley rotational angle) which defines a relationship between the between-pulley rotational angle and a torque (the secondary torque $\tau$) transmitted from the drive pulley 2 side to the driven pulley 3 side by the elastic deformation (expansion and contradiction) of the wires 4, 4 accompanying the same, changes depending on the rotational angle of the rotational bar 24.

More specifically, in the present embodiment, the rigidity of the wires 4, 4 becomes the minimum (the elastic deformation coefficient Ksp is minimum) in a state where the rotational bar 24 is extending in a direction orthogonal to the interval direction of the drive pulley 2 and the driven pulley 3, as is shown in FIG. 9. Hereinafter, this state will be referred to as a minimum rigidity state.

Thereafter, when the rotational bar 24 is rotated from the minimum rigidity state, the rigidity of the wires 4, 4 increases (the elastic deformation coefficient Ksp increases) accompanying the increase of the rotational angle thereof (a rotational angle taking the minimum rigidity state as a reference).

The rotational driving of the rotational bar 24 may be performed by a mechanism of a similar configuration to the mechanism performing rotational driving of the drive pulley 2 by the electric motor 5.

Further, the wire 4 may be an endless member wound around the drive pulley 2 and the driven pulley 3.

Returning to FIG. 8, the present embodiment is further provided with, as a configuration for operational control of the power transmission device 21, similarly to the first embodiment, a control device 30 configured from an electronic circuit unit, and the angle detectors 11, 12 respectively detecting the rotational angle $\theta$in of the drive pulley 2 and the rotational angle $\theta$out of the driven pulley 3. Further, the output signals (the detected signals) of the angle detectors 11, 12 are input to the control device 30.

Further, the control device 30 is sequentially input with the desired secondary torque $\tau$_cmd from the outside other control device or the server and the like similarly to the first embodiment, and in addition, a desired value Ksp_cmd of the elastic deformation coefficient Ksp of the wires 4, 4 (hereinafter referred to as a desired deformation coefficient Ksp_cmd) is sequentially input from the outside other control device or the server and the like.

In the present embodiment, the elastic deformation coefficient Ksp is defined according to the rotational angle of the rotational bar 24 of the rigidity variable mechanism 22. As such, a desired value of the rotational angle of the rotational bar 24, or a desired value of the rotational angle of the output shaft of the electric motor 27 of the rigidity variable mechanism 22 may be input to the control device 30, in place of the desired elastic deformation coefficient Ksp_cmd.

Further, as a function realized by a program processing (a function realized by a software) or a main function realized by a hardware configuration, the control device 30 is equipped with a control input determining unit 33 and a motor control unit 34 respectively having a function similar to the first embodiment, and further is equipped with a rigidity control unit 35 which controls the rigidity of the wires 4, 4 according to the desired elastic deformation coefficient Ksp_cmd, by controlling the electric motor 27 of the rigidity variable mechanism 22.

In the present embodiment, the control input determining unit 33 sequentially determines the desired torque $\tau$m_cmd of the electric motor 5 as the control input, by the control processing of the sliding-mode control, similarly to the first embodiment. That is, the control input determining unit 33 calculates the value of the switching function $\sigma$ based on the expression (7), and determines $\tau$m_cmd by the calculation of the expression (6) using the value of $\sigma$.

However, the elastic deformation coefficient Ksp of the wires 4,4 is variable in the present embodiment. Therefore, in order to appropriately converge the secondary torque deviation $\tau$_err to zero, it is necessary to change the gradient of the switching hyperplane $\sigma$=0 (and consequently the time constant Tc of the convergent response of the secondary torque deviation $\tau$_err on the switching hyperplane $\sigma$=0) according to the value of Ksp.

Therefore, in the present embodiment, a correlation data for determining the gradient of the switching hyperplane $\sigma$=0 (or the time constant Tc) according to the value of the elastic deformation coefficient Ksp of the wires 4, 4 is created preliminarily as is explained below.

Specifically, a plurality of representative values Ksp_i (i=1, 2, . . . , M) of the value of Ksp are selected within the variable range of the elastic deformation coefficient Ksp. Thereafter, the same advance preparation process as the procedures 1 through 3 explained in the first embodiment is executed, in the state where the rigidity variable mechanism 22 is controlled so as to stably maintain the actual elastic deformation coefficient Ksp_act of the wires 4, 4 to respective representative value Ksp_i (in a state where the rotational angle of the rotational bar 24 is held to the rotational angle corresponding to the representative value Ksp_i). With this processing, the suitable gradient of the switching hyperplane $\sigma$=0 (or the time constant Tc of the convergent response of $\tau$_err on the switching hyperplane $\sigma$=0) for each representative value Ksp_i of the elastic deformation coefficient Ksp is determined.

In this case, by the processing of the above-mentioned procedure 3, the gradient of the switching hyperplane $\sigma$=0 for each representative value Ksp_i of the elastic deformation coefficient Ksp is determined so that the corresponding time constant Tc becomes a time constant equal to or more than the specific time constant Tcx determined by the expression (20) according to the respective value Ksp_i (so as to satisfy the time constant constraint condition).

Further, in the advance preparation process of the present embodiment, an arithmetic expression which approximates a relationship between the value of Ksp and the gradient of the switching hyperplane $\sigma$=0 (or the time constant Tc corresponding to the gradient) is determined, using a plurality of the respective values Ksp_i (i=1, 2, . . . , M) of the elastic deformation coefficient Ksp, and the gradient of the switching hyperplane $\sigma$=0 (or the time constant Tc corresponding to the gradient) determined corresponding to each of the respective values Ksp_i.

Specifically, according to experiments and considerations by the inventors of the present application, the relationship between the value of the time constant Tc corresponding to the gradient of the switching hyperplane $\sigma$=0 determined as explained above, and a value of the elastic deformation coefficient Ksp, may be roughly approximated by a format of following expression (22).

$$Tc = c2/\mathrm{sqrt}(Ksp) + c1 \cdot Ksp + c0 \tag{22}$$

Therefore, in the present embodiment, values of coefficients c2, c1, and c0 in each column of a right side of expression (22) is determined by a statistical identification approach such as the least squares method, using a plurality of the representative values Ksp_i (i=1, 2, . . . , M) of the elastic deformation coefficient Ksp, and the values of the time constant Tc corresponding to the gradients of the switching hyperplane (3=0 determined corresponding respectively to the Ksp_i. By doing so, the arithmetic expression approximating the relationship between Ksp and the time constant Tc corresponding to the gradient of the switching hyperplane $\sigma$=0 is determined.

In this case, the values of the coefficients c2, c1, and c0 are determined, such that the value of the time constant Tc calculated by the expression (22) corresponding to each representative value Ksp_i of the elastic deformation coefficient Ksp becomes a value equal to or larger than the specific time constant Tcx determined by the expression (20) corresponding to the representative value Ksp_i.

In the present embodiment, the arithmetic expression and the values of the coefficients c2, c1, and c0 determined by the advance preparation process as is explained above, are memorized and stored in a memory not shown of the control device 30.

Here, the expression (22) may be converted to an arithmetic expression approximating the relationship between the gradient of the switching hyperplane $\sigma$=0 and the value of the elastic deformation coefficient Ksp using the relational expression between the gradient of the switching hyperplane $\sigma$=0 and the time constant Tc (a relational expression that gradient=−1/Tc, or gradient=−Tc), and the arithmetic expression and the value of the coefficient concerning the arithmetic expression may be memorized and stored in a memory not shown of the control device 30.

Subsequently an operation of the control device 30 when controlling the output torque of the electric motor 5 so as to make the secondary torque $\tau$ of the power transmission device 21 follow the desired secondary torque $\tau$_cmd, will be explained.

In the present embodiment, the control device 30 executes the processing of the rigidity control unit 35 according to the input desired elastic deformation coefficient Ksp_cmd in each control processing cycle.

The rigidity control unit 35 determines a desired value of the rotational angle of the rotational bar 24 corresponding to the desired elastic deformation coefficient Ksp_cmd (current value), for example, by a predetermined map (or a predetermined arithmetic expression) preliminarily memorized and stored in a memory not shown. Thereafter, by controlling the energization current of the armature winding not shown of the electric motor 27 of the rigidity variable mechanism 22 by a method of known servo control, the rigidity control unit 35 controls the actual rotational angle of the rotational bar 24 to the desired value. By this control, the actual elastic deformation coefficient Ksp_act of the wires 4,4 is controlled to the desired elastic deformation coefficient Ksp_cmd.

Figure 11:
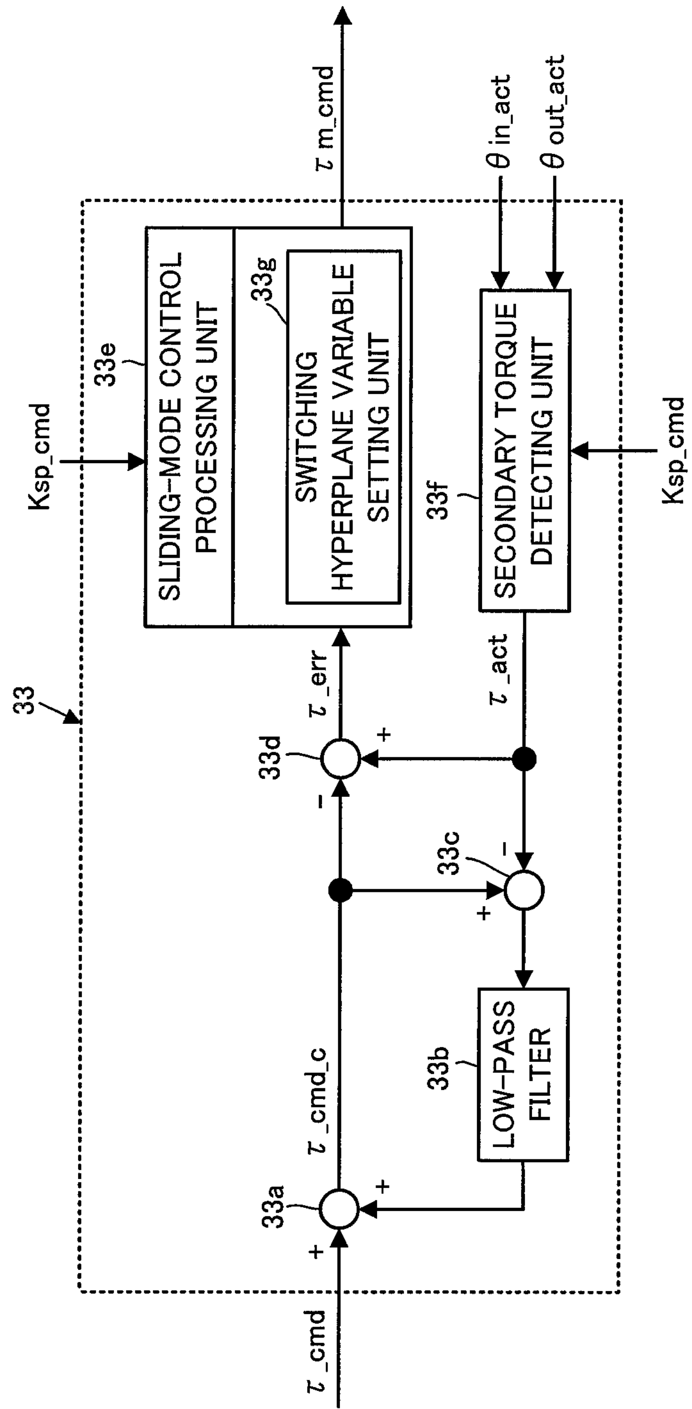
FIG. 11 is a block diagram showing a processing of the control input determining unit of the control device shown in FIG. 8.

Concurrently with the control processing of the rigidity control unit 35, the control device 30 sequentially determines the desired torque $\tau$m_cmd of the electric motor 5 as the control input, by executing the processing shown in block diagram in FIG. 11 by the control input determining unit 33.

In each control processing cycle of the control device 30, the control input determining unit 33 is sequentially input with the actual rotational angle $\theta$in_act (detected value) of the drive pulley 2 and the actual rotational angle $\theta$out_act (detected value) of the driven pulley 3, that are indicated by the output signals (detected signals) of the angle detectors 11, 12, respectively, and also is sequentially input with the desired secondary torque $\tau$_cmd and the desired elastic deformation coefficient Ksp_cmd.

Further, the control input determining unit 33 calculates the secondary torque deviation $\tau$_err, by executing the processing of a secondary torque detecting unit 33*f*, an arithmetic unit 33*c*, a low-pass filter 33*b*, an arithmetic unit 33*a*, and an arithmetic unit 33*d*. These processing are the same as the processing of the secondary torque detecting unit 13*f*, the arithmetic unit 13*c*, the low-pass filter 13*b*, the arithmetic unit 13*a*, and the arithmetic unit 13*d* of the first embodiment.

However, in this case, the secondary torque detecting unit 33*f* is input with the value (current value) of the desired elastic deformation coefficient Ksp_cmd. Further, the secondary torque detecting unit 33*f* calculates an estimated value of the actual secondary torque $\tau$_act, by performing the calculation of the right side of the expression (1), using the value of Ksp_cmd and the values (current values) of $\theta$in_act, $\theta$out_act.

Subsequently, the control input determining unit 33 inputs the secondary torque deviation $\tau$_err and the desired elastic deformation coefficient Ksp_cmd calculated as explained above to a sliding-mode control processing unit 33*e*.

The sliding-mode control processing unit 33*e* includes a switching hyperplane variable setting unit 33*g* which variably determines the gradient of the switching hyperplane $\sigma$=0 (or the time constant Tc corresponding thereto). The sliding-mode control processing unit 33*e* first executes the processing of the switching hyperplane variable setting unit 33*g* in every control processing cycle.

The switching hyperplane variable setting unit 33*g* calculates the value of the time constant Tc, by performing the calculation of the right side of the expression (22), using the value (current value) of the desired elastic deformation coefficient Ksp_cmd in the present control processing cycle, as the value of Ksp in the right side of the expression (22). By doing so, the gradient of the switching hyperplane $\sigma$=0 is also determined substantively. Further, the value of the time constant Tc calculated by the expression (22) may be converted to the value of the gradient of the switching hyperplane $\sigma$=0.

Thereafter, the sliding-mode control processing unit 33*e* calculates the value of the switching function $\sigma$ by the expression (7), using the values of the coefficient components s1, s2 (in this case, one of the values of s1, s2 is a value of constant (for example, 1)) of the switching function $\sigma$ defined by the value of the time constant Tc calculated as is explained above. Further, the sliding-mode control processing unit 33*e* sequentially calculates the desired torque $\tau$m_cmd of the electric motor 5 as the control input, by performing the calculation of the right side of the expression (6) using the calculated value of the switching function $\sigma$.

In this case, the secondary torque deviation velocity d$\tau$_err necessary for the calculation of the expression (7) is calculated as a temporal change rate of the secondary torque deviation $\tau$_err input to the sliding-mode control processing unit 33*e*.

Further, of each components of A, B necessary for the calculation of the expression (6), components other than the component of second row, first column of the matrix A are memorized and stored in a memory not shown, as preset values based on the definition in the where clause of expression (4). On the other hand, the component of the second row, first column of the matrix A (=−rin·DT−rout·DT) is calculated according to the value (current value) of the desired elastic deformation coefficient Ksp_cmd in the present embodiment.

That is, the values of rin, rout are respectively calculated according to the value (current value) of Ksp_cmd according to the definition of the where clause of the expression (2), and the component of the second row first column of the matrix A is calculated from the calculated value of rin, rout, and the value (preset value) of the control processing cycle DT. The values of the input side inertia In and the output side inertia Tout used for calculating rin, rout are preset values.

The control input determining unit 33 sequentially determines the desired torque $\tau$m_cmd of the electric motor 5 (the control input) by the processing explained above.

Similar to the case of the first embodiment, in the case where the offset component (steady error component) included in the secondary torque $\tau$_act is sufficiently minute, the arithmetic units 33*a*, 33*c*, and the low-pass filter 33*b* may be omitted, and $\tau$_cmd may be input to the arithmetic unit 33*d* as it is.

The control device 30 inputs the desired torque $\tau$m_cmd sequentially determined by the control input determining unit 33 as is explained above to the motor control unit 34, and executes the processing of the motor control unit 34. Similarly to the motor control unit 14 of the first embodiment, the motor control unit 34 determines the command value (desired value) of the energizing current of the armature winding not shown of the electric motor 5 according to the input desired torque $\tau$_cmd. Therefore, the motor control unit 34 feedback controls the energization current of the armature winding so as to coincide the actual energization current to the determined command value.

By doing so, the actual output torque of the electric motor 5 is controlled to the desired torque $\tau$m_cmd. Consequently, the actual secondary torque $\tau$_act is controlled so as to follow the desired secondary torque $\tau$_cmd, while the elastic deformation coefficient Ksp of the wires 4, 4 (the rigidity of the wires 4, 4) are arbitrarily changed.

In the embodiment explained above, the gradient of the switching hyperplane $\sigma$=0 (or the time constant Tc corresponding thereto) corresponding to each of a plurality of the representative values Ksp_i (i=1, 2, . . . , M) of the elastic deformation coefficient Ksp of the wires 4, 4 is determined using a plurality of the response characteristics data, in the advance preparation process, in the same manner as in the first embodiment.

As such, the gradient of the switching hyperplane σ=0 (or the time constant Tc corresponding thereto) corresponding to each representative value Ksp_i of Ksp is determined so as to preferably converge the secondary torque deviation τ_err to zero, while maintaining Ksp to the representative value Ksp_i.

Further, the arithmetic expression approximating the relationship between the gradient of the switching hyperplane σ=0 (or the time constant Tc corresponding thereto) and the value of the elastic deformation coefficient Ksp is determined by a method of least squares method and the like, based on the gradient of the switching hyperplane σ=0 (or the time constant Tc corresponding thereto) corresponding to a plurality of the representative values Ksp_i (i=1, 2, . . . , M).

Thereafter, in the control processing of the secondary torque τ of the power transmission device 21 by the control device 30, the gradient of the switching hyperplane σ=0 (or the time constant Tc corresponding thereto) corresponding to the desired elastic deformation coefficient Ksp_cmd of an arbitral value is determined on the basis of the above-mentioned arithmetic expression. As such, a preferable gradient of the switching hyperplane σ=0 (or the time constant Tc corresponding thereto) with respect to Ksp of the arbitral value of the wires 4, 4 is determined Consequently, the preferable values of the coefficient components s1, s2 (preferable with respect to the elastic deformation coefficient Ksp of the wires 4, 4, in each control processing cycle) of the switching function σ used for determining the control input in the processing of the sliding-mode control may be determined.

As a result, the control input (the desired torque τm_cmd of the electric motor 5) may be determined by the processing of the sliding-mode control, so as to appropriately perform the control of the secondary torque τ with high robustness, while variably controlling the elastic deformation coefficient Ksp of the wires 4, 4 to an arbitral value. That is, it becomes possible to appropriately perform the control of the secondary torque τ with high robustness, in any rigidity, while controlling the rigidity of the wires 4,4 to a desired rigidity.

Specifically, the gradient of the switching hyperplane σ=0 determined by the switching hyperplane variable setting unit 33*g* according to the desired elastic deformation coefficient Ksp_cmd by the arithmetic expression (22) is basically determined so that the time constant Tc corresponding to the gradient becomes equal to or larger than the specific time constant Tcx calculated by the expression (20) corresponding to Ksp_cmd. As such, the control of the secondary torque τ may be stably performed with high robustness in a wide operating region of the power transmission device 1, without depending on the control state of the elastic deformation coefficient Ksp_cmd.

The corresponding relationship between the present embodiment explained above and the present invention will be supplemented. Similarly to the case of the first embodiment, the drive pulley 2, the driven pulley 3, the wire 4, and the electric motor 5 respectively corresponds to the primary element, the secondary element, the elastic deformation member, and the actuator of the present invention. Further, the rotation of the drive pulley 2 corresponds to the displacement of the primary element, the secondary torque τ corresponds to the secondary power of the present invention, and the elastic deformation coefficient Ksp (the elastic deformation coefficient Ksp made variable by the rigidity variable mechanism 22) corresponds to the elastic deformation coefficient of the present invention.

Further, the control input determining unit 33 of the control device 30 corresponds to the control input determining element of the present invention, and the switching hyperplane variable setting unit 33*g* of the sliding-mode control processing unit 33*e* corresponds to a switching hyperplane variable setting element of the present invention.

Further, similar to the case of the first embodiment, the secondary torque deviation τ_err and the secondary torque deviation velocity dτ_err respectively corresponds to the first variable component and the second variable component of the present invention. Further, the first permissible limit value τ_err_lim, the secondary permissible limit value dτ_err_lim, the first set value τ_err_a, and the second set value dτ_err_a of the present embodiment respectively corresponds to the first permissible limit value, the second permissible limit value, the first set value, and the second set value of the present invention.

In this case, in the present embodiment, the first permissible limit value τ_err_lim, the secondary permissible limit value dτ_err_lim, the first set value τ_err_a, and the second set value dτ_err_a are respectively set to values corresponding to each of a plurality of the representative values Ksp_i (i=1, 2, . . . , M) of the elastic deformation coefficient Ksp.

Further, lines LL1p, LL1n correspond to the first set value line of the present invention, and lines LL2p, LL2n correspond to the second set value line of the present invention. Further, the specific time constant Tcx corresponds to the specific time constant of the present invention. In this case, in the present embodiment, the specific time constant Tcx is set to values respectively corresponding to a plurality of the representative values Ksp_i (i=1, 2, . . . , M) of the elastic deformation coefficient Ksp.

Further, the desired elastic deformation coefficient Ksp_cmd corresponds to a control value of the elastic deformation coefficient of the present invention.

Fourth Embodiment

Subsequently, a fourth embodiment of the present invention will be explained with reference to FIG. 12. The present embodiment differs from the third embodiment in a part of the processing of the sliding-mode control processing unit. Therefore, explanation of the present embodiment will be mainly on the matters differing from the third embodiment, and the explanation on the identical matters with the third embodiment will be omitted.

In the present embodiment, in the processing of the control input determining unit 33, similarly to the second embodiment, the values of the secondary torque deviation τ_err and the secondary torque deviation velocity dτ_err are sequentially estimated using an observer, so as to reduce the influence of disturbance. Thereafter, the control input (the desired torque τm_cmd) is determined by executing the processing of the sliding-mode control using the secondary torque deviation estimated value τ_err_hat and the secondary torque deviation velocity estimated value dτ_err_hat, that are estimated values by the observer, in place of the actual secondary torque deviation τ_err_act calculated using the actual secondary torque τ_act (the estimated value by the secondary torque detecting unit 13*f*) and the actual secondary torque deviation velocity dτ_err_act obtained as the temporal change rate thereof.

Figure 12:
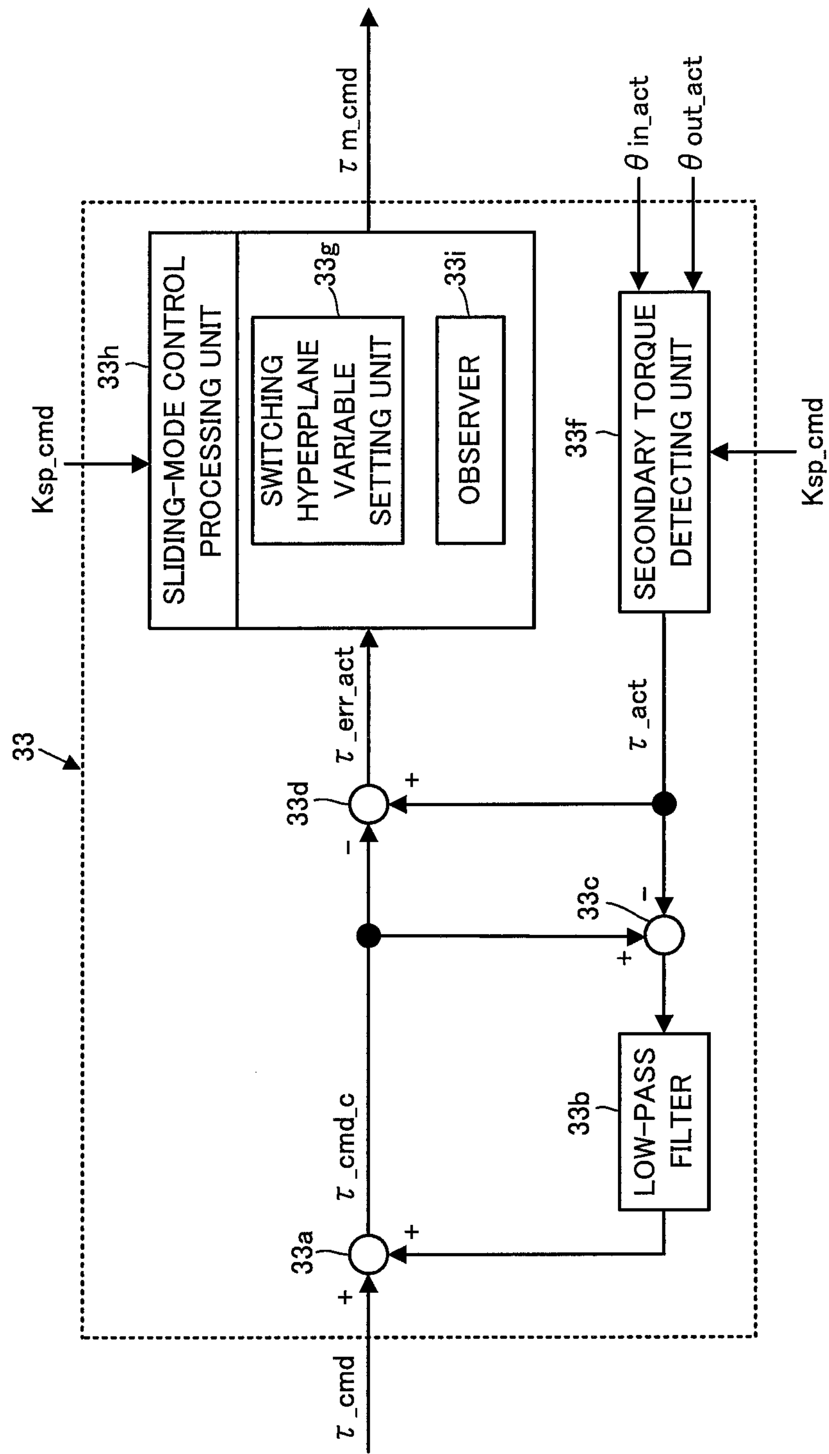
FIG. 12 is a block diagram showing a processing of the control input determining unit in a fourth embodiment of the present invention.

Specifically, in the present embodiment, as is shown in FIG. 12, a sliding-mode control processing unit 33*h* of the control input determining unit 33 includes a function as an observer 33*i*.

Thereafter, the control input determining unit 33 determines the corrected desired secondary torque τ_cmd_c by performing the same processing as the third embodiment by the secondary torque detecting unit 33*f*, the arithmetic unit 33*c*, the low-pass filter 33*b*, and the arithmetic unit 33*a*.

The sliding-mode control processing unit 33*h* is input with the deviation (the output of the arithmetic unit 33*d*) between the estimated value of the actual secondary torque τ_act calculated by the secondary torque detecting unit 33*f*, and the corrected desired secondary torque τ_cmd_c, as the actual secondary torque deviation τ_err_act. Further, the sliding-mode control processing unit 33*h* is input with the desired elastic deformation coefficient Ksp_cmd.

In each control processing cycle of the control device 30, the observer 33*i* calculates the secondary torque deviation estimated value τ_err_hat and the secondary torque deviation velocity estimated value dτ_err_hat with the disturbance component reduced, similarly to the second embodiment, by the calculation of the expression (21).

However, in the present embodiment, Kobs in the right side of above-mentioned expression (21) is determined variably by a predetermined map or an arithmetic expression, according to the value (current value) of the desired elastic deformation coefficient Ksp_cmd. Further, the component of the second row, first column of the matrix A of the expression (21) is calculated according to the value (current value) of the desired elastic deformation coefficient Ksp_cmd, by the same calculating method as the calculating method explained in the third embodiment.

The calculation processing (processing of the observer 33*i*) of the secondary torque deviation estimated value τ_err_hat and the secondary torque deviation velocity estimated value dτ_err_hat in the present embodiment is the same as the second embodiment, except for those related to the value of Kobs in the expression (21), and the value of the components of the second row, first column of the matrix A.

The sliding-mode control processing unit 33*h* of the present embodiment calculates the time constant Tc corresponding to the gradient of the switching hyperplane σ=0 corresponding to the current value of the desired elastic deformation coefficient Ksp_cmd, by performing the same processing as the third embodiment in the switching hyperplane variable setting unit 33*g*.

Thereafter, the sliding-mode control processing unit 33*h* calculates the value of the switching function σ according to the expression (7), using the values of the coefficient components s1, s2 (in this case, one of the values of s1, s2 is a value of constant (for example, 1)) of the switching function σ defined by the value of the time constant Tc calculated by the switching hyperplane variable setting unit 33*g*, and the secondary torque deviation estimated value τ_err_hat and the secondary torque deviation velocity estimated value dτ_err_hat calculated by the observer 33*i*. Further, the sliding-mode control processing unit 33*h* sequentially calculates the desired torque τm_cmd of the electric motor 5 as the control input by performing the calculation of the right side of above-mentioned expression (6) using the calculated value of the switching function σ.

The present embodiment is the same as the third embodiment, other than matters explained above.

Similar effect as the third embodiment may be obtained in such embodiment.

In addition, in the present embodiment, the control processing of the sliding-mode control is performed using the secondary torque deviation estimated value τ_err_hat and the secondary torque deviation velocity estimated value dτ_err_hat calculated by the observer 33*i*, in place of the actual secondary torque deviation τ_err_act and the secondary torque deviation velocity dτ_err_act as the temporal change rate thereof calculated using the estimated value of the actual secondary torque τ_act sequentially calculated by the secondary torque detecting unit 13*f*. Therefore, the control input (the desired torque τm_cmd) may be determined while reducing the influence of the disturbance component included in the estimated value of the secondary torque τ_act or the temporal change rate thereof.

Therefore, the robustness of the control of the secondary torque τ by the control device 30 may be improved further.

The corresponding relationship between the present embodiment explained above and the present invention will be supplemented. In the present embodiment, the observer 33*i* corresponds to the observer of the present invention. The corresponding relationship of the present embodiment and the present invention is the same as the third embodiment other than the above.

[Modification]

Subsequently, several modifications related to each embodiment will be explained.

In each embodiment, the actual secondary torque τ_act is calculated by multiplying the between-rotor angular difference calculated from the detected value of the rotational angle θin_act of the drive pulley and the detected value of the rotational angle θout_act of the driven pulley 3 with the value (preset value or desired value) of the elastic deformation coefficient Ksp.

However, the secondary torque τ_act may be detected directly, by using an appropriate torque sensor configured from a strain gauge and the like.

Further, in each embodiment, the electric motor 5 is used as the actuator generating the driving force. However, an eclectic actuator other than the electric motor 5, or an actuator of another type, such as a hydraulic actuator, may be used.

Further, in the third embodiment and the fourth embodiment, during the operational control of the power transmission device 21, the switching hyperplane variable setting unit 33*g* determines the time constant Tc corresponding to the gradient of the switching hyperplane σ=0 according to the desired elastic deformation coefficient Ksp_cmd, using above-mentioned expression (22) which is the predetermined arithmetic expression.

However, the time constant Tc (or the gradient of the switching hyperplane σ) corresponding to the desired elastic deformation coefficient Ksp_cmd may be determined by preparing a map data on a plurality of the representative values Ksp_i (i=1, 2, . . . , M) of the elastic deformation coefficient Ksp and the time constant Tc (or the gradient of the switching hyperplane σ) respectively corresponding thereto, and using the map data.

In this case, in the case where the desired elastic deformation coefficient Ksp_cmd coincides with any of the representative values Ksp_i, then the time constant Tc (or the gradient of the switching hyperplane σ) corresponding to the representative value Ksp_i in the map data may be determined as it is as the time constant Tc (or the gradient of the switching hyperplane σ) corresponding to the desired elastic deformation coefficient Ksp_cmd.

Further, in the case where the desired elastic deformation coefficient Ksp_cmd does not coincide with any of the representative values Ksp_i, then the time constant Tc (or the gradient of the switching hyperplane σ) corresponding to the desired elastic deformation coefficient Ksp_cmd may be determined by an interpolation calculation based on the map data.

Further, in each embodiment, the power transmission between the drive pulley 2 and the driven pulley 3 is performed via the wire 4 as the elastic deformation member. However, the elastic deformation member connecting the two elements such as the pulleys 2, 3 (between the primary element and the secondary element) so as to perform power transmission between the two elements may adopt various modes.

For example, the power transmission (rotation transmission) between two rotating elements as the primary element and the secondary element may be performed via a torsion bar as the elastic deformation member.

Further, in the case of performing the power transmission between the two rotational elements by the elastic deformation member with the rigidity thereof variable, for example a conductive polymer actuator may be adopted as the elastic deformation member.

Figure 13:
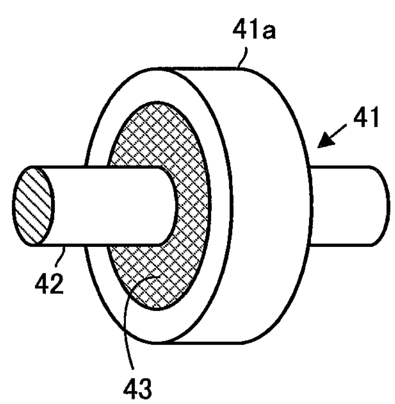
FIG. 13 is a perspective view showing a configuration of a substantial part of the power transmission device in a modified form.

For example, as is exemplified in FIG. 13, a driven rotational member 42 (the secondary element) is inserted into a hollow tubular portion 41*a*, which is formed to a leading end portion of a driving rotational element 41 (the primary element). Thereafter, a power transmission between the driving rotational member 41 and the driven rotational member 42 may be performed via a conductive polymer actuator 43 (the elastic deformation member) provided between an outer circumferential surface of the driven rotational member 42 and an inner circumferential surface of the tubular portion 41*a*.

In this case, the rigidity of the conductive polymer actuator 43 (and consequently the elastic deformation coefficient) may be changed to a desired rigidity, by changing a voltage applied to the conductive polymer actuator 43.

Further, the power transmission device as the target of the present invention is not limited to those transmitting the rotational driving force, and may be of a configuration of transmitting a translational force accompanying a translational displacement of the primary element to the secondary element via the elastic deformation member.

Further, the elastic deformation member performing the power transmission between the primary element and the secondary element may have viscosity, in addition to being capable of deforming elastically.

In this case, it is preferable to determine the control input by the sliding-mode control, based on a state equation (a model of a power transmission system) taking the viscosity of the elastic deformation member into consideration.

For example, similar to the power transmission device 1 (or 21) shown in FIG. 1 (or FIG. 8), in the power transmission device performing the power transmission (the rotation transmission) between the drive pulley 2 and the driven pulley 3 via an appropriate elastic deformation member, in the case where the elastic deformation member has viscosity, then a behavior of the power transmission device may be modeled in the discrete system by a state equation of following expression (23).

$$\begin{bmatrix} \theta\text{ in }(n) \\ d\theta\text{ in }(n) \\ \theta\text{ out }(n) \\ d\theta\text{ out }(n) \end{bmatrix} = \begin{bmatrix} 1 & DT & 0 & 0 \\ -rin\cdot DT & 1-Cin\cdot DT & rin\cdot DT & Cin\cdot DT \\ 0 & 0 & 1 & DT \\ rout\cdot DT & Cout\cdot DT & -rout\cdot DT & 1-Cout\cdot DT \end{bmatrix}\cdot \tag{23}$$

-continued $$\begin{bmatrix} \theta\text{ in }(n-1) \\ d\theta\text{ in }(n-1) \\ \theta\text{ out }(n-1) \\ d\theta\text{ out }(n-1) \end{bmatrix} + \begin{bmatrix} 0 \\ DT/Iin \\ 0 \\ 0 \end{bmatrix}\cdot u(n-1)$$

where, $$r\text{ in} \equiv K\,sp/I\text{ in},$$

$$r\text{ out} \equiv K\,sp/I\text{ out}$$

$$Cin \equiv K\,dmp/I\text{ in},$$

$$Cout \equiv K\,dmp/I\text{ out}$$

The meaning of θin, θout, Ksp, DT, Iin, and Iout in the expression (23) is the same as the expression (1).

Further, Kdmp corresponds to a viscosity coefficient of the elastic deformation member between both pulleys 2, 3. More specifically, Kdmp is a change amount of a viscous force (in this case, a viscous force in a dimension of a torque) per unit change amount of relative angular velocity of the drive pulley 2 with respect to the driven pulley 3.

Thereafter, after simplifying the expression (23) using above-mentioned expressions (3a), (3b), a state equation of following expression (24) is obtained, as a model expressing a behavior related to the secondary torque τ and the temporal change rate thereof (the secondary torque change speed) dτ of the power transmission device equipped with the elastic deformation member having viscosity between both pulleys 2, 3.

$$\begin{bmatrix} \tau(n) \\ d\tau(n) \end{bmatrix} = A'\cdot\begin{bmatrix} \tau(n-1) \\ d\tau(n-1) \end{bmatrix} + B'\cdot u(n-1) \tag{24}$$

where, $$A' \equiv \begin{bmatrix} 1 & DT \\ -rin\cdot DT - rout\cdot DT & 1-Cin\cdot DT - Cout\cdot DT \end{bmatrix}$$

$$B' \equiv \begin{bmatrix} 0 \\ Ksp\cdot DT/Iin \end{bmatrix}$$

Therefore, the control input (the desired torque τm_cmd of the electric motor 5) by the sliding-mode control may be calculated by an expression in which A, B of above-mentioned expression (6) is substituted by A', B' defined by the where clause of expression (24).

What is claimed is:

1. A control device of a power transmission device equipped with a primary element which displaces by a driving power of an actuator, and a secondary element coupled to the primary element via an elastic deformation member capable of deforming elastically, and which is provided so as to relatively displace with respect to the primary element by the elastic deformation of the elastic deformation member, and to receive a power transmission from the primary element via the elastic deformation member, the control device controlling a secondary power as a power applied to the secondary element by the power transmission to a desired value, the control device comprising:

a control input determining unit configured to sequentially determine a control input for controlling the driving force of the actuator, with a control processing of a sliding-mode control using a switching function configured taking a deviation between an observed value and the desired value of the secondary power as a first variable component, and a temporal change rate of the deviation as a second variable component, so as to converge the first variable component on a switching hyperplane defined by the switching function to zero;

wherein a gradient of the switching hyperplane in a phase plane taking the first variable component and the second variable component as two coordinate axis components is set, based on a specific response characteristics data satisfying a predetermined requirement among a plurality of the response characteristics data preliminarily obtained as data indicating a trajectory of a transition of a set of a value of the first variable component and a value of the second variable component when the first variable component is converged from an arbitral value to zero;

when a line indicating a first set value preliminarily set according to a first permissible limit value, the first permissible limit value being a preliminarily set permissible limit value of a magnitude of the value of the first variable component, between the first permissible limit value and zero, on the phase plane, is defined as a first set value line, and a line indicating a second set value preliminarily set according to a second permissible limit value, the second permissible limit value being a preliminarily set permissible limit value of a magnitude of the value of the second variable component, between the second permissible limit value and zero, on the phase plane, is defined as a second set value line, then the specific response characteristics data satisfying the predetermined requirement is a response characteristics data satisfying a requirement that the magnitude of the value of the first variable component and the magnitude of the value of the second variable component on the trajectory indicated by the specific response characteristics data are equal to or smaller than the first permissible limit value and equal to or smaller than the second permissible limit value, respectively, and that the trajectory intersects with the first set value line or the second set value line; and the gradient of the switching hyperplane is set so that, among intersections between the trajectory indicated by respective specific response characteristics data and the first set value line or the second set value line on the phase plane, a gradient of a line connecting the intersection and an origin of the phase plane coincides with or is approximate to a gradient of a line connecting an intersection satisfying a condition that it is within a preliminarily set requirement range of the gradient of the switching hyperplane, and the origin of the phase plane.

2. The control device of the power transmission device according to claim 1, wherein the elastic deformation member is a member configured so that an elastic deformation coefficient which represents a rate of change of a generated elastic force of the elastic deformation member with respect to a change in a deformation amount thereof becomes constant, and the first permissible limit value is a value determined, so that a displacement velocity and a displacement acceleration of the primary element by the driving force of the actuator do not exceed preliminarily set permissible limit values, respectively, according to the permissible limit value of the displacement velocity of the primary element, the permissible limit value of the displacement acceleration of the primary element, and a value of the elastic deformation coefficient of the elastic deformation member.

3. The control device of the power transmission device according to claim 2, wherein the second permissible limit value is a value determined according to the value of the elastic deformation coefficient of the elastic deformation member, so as to prevent generation of oscillation of a power transmission system from the actuator to the secondary element according to a natural oscillation of the power transmission system.

4. The control device of the power transmission device according to claim 1, wherein the elastic deformation member is a member configured so that an elastic deformation coefficient which represents a rate of change of a generated elastic force of the elastic deformation member with respect to a change in a deformation amount thereof becomes constant, and the second permissible limit value is a value determined according to the value of the elastic deformation coefficient of the elastic deformation member, so as to prevent generation of oscillation of a power transmission system from the actuator to the secondary element according to a natural oscillation of the power transmission system.

5. The control device of the power transmission device according to claim 1, wherein the elastic deformation member is a member configured so as to be capable of variably controlling an elastic deformation coefficient which represents a rate of change of a generated elastic force of the elastic deformation member with respect to a change in a deformation amount thereof, the control input determining unit includes a switching hyperplane variable setting unit which sequentially determines the gradient of the switching hyperplane used for the control processing of the sliding-mode control for determining the control input, according to a control value of the actual elastic deformation coefficient of the elastic deformation member, the switching hyperplane variable setting unit is configured to determine the gradient of the switching hyperplane corresponding to the control value of the actual elastic deformation coefficient of the elastic deformation member, using a map data representing a relationship between a plurality of representative values of the elastic deformation coefficient preliminarily set within a variable range of the elastic deformation coefficient of the elastic deformation member, and the gradient of the switching hyperplane preliminarily set based on the specific response characteristics data according to each of the representative value, or using a predetermined arithmetic expression preliminarily set so as to approximate the relationship, and the specific response characteristics data used for setting the gradient of the switching hyperplane corresponding to an arbitral one representative value among a plurality of the representative values of the elastic deformation coefficient, is a response characteristics data satisfying the predetermined requirement corresponding to the one representative value, among the response characteristics data preliminarily acquired in a state where the elastic deformation coefficient of the elastic deformation member is maintained to the one representative value, and also the first permissible limit value, the second permissible limit value, and the requirement range of the gradient of the switching hyperplane related to the predetermined requirement, are preliminarily set according to the one representative value of the elastic deformation coefficient, respectively.

6. The control device of the power transmission system according to claim 5, wherein the first permissible limit value corresponding to the arbitral one representative value among a plurality of the representative values of the elastic deformation coefficient is a value determined, so that a displacement velocity and a displacement acceleration of the primary element by the driving force of the actuator do not exceed preliminarily set permissible limit values, respectively, in a state where the elastic deformation coefficient of the elastic deformation member is maintained to the one representative value, according to the permissible limit value of the displacement velocity of the primary element, the permissible limit value of the displacement acceleration of the primary element, and the one representative value of the elastic deformation coefficient.

7. The control device of the power transmission device according to claim 5, wherein the second permissible limit value corresponding to the arbitral one representative value among a plurality of the representative values of the elastic deformation coefficient, is a value determined according to the one representative value, so as to prevent generation of oscillation of a power transmission system from the actuator to the secondary element according to a natural oscillation of the power transmission system, in a state where the elastic deformation coefficient of the elastic deformation member is maintained to the one representative value.

8. The control device of the power transmission device according to claim 2, wherein the gradient of the switching hyperplane is set, taking a condition that a time constant of convergence of the value of the first variable component on the switching hyperplane defined by the gradient of the switching hyperplane to zero becomes equal to or larger than a specific time constant, the specific time constant being a time constant realized in a case supposing that the value of the first variable component is changed stepwise from zero to the first permissible limit value and also the convergence of the value of the first variable component to zero is performed so that the displacement acceleration of the primary element by the driving force of the actuator becomes the permissible limit value of the displacement acceleration, as a constraint condition.

9. The control device of the power transmission device according to claim 4, wherein the gradient of the switching hyperplane is set, taking a condition that a time constant of convergence of the value of the first variable component on the switching hyperplane defined by the gradient of the switching hyperplane to zero becomes equal to or larger than a specific time constant, the specific time constant being a time constant realized in a case supposing that the value of the first variable component is changed stepwise from zero to the first permissible limit value and also the convergence of the value of the first variable component to zero is performed so that the displacement acceleration of the primary element by the driving force of the actuator becomes the permissible limit value of the displacement acceleration, as a constraint condition.

10. The control device of the power transmission device according to claim 8, wherein the specific time constant is a time constant calculated as a value proportional to an inverse value of a square root of a value of the elastic deformation coefficient, from the first permissible limit value, the permissible limit value of the displacement acceleration of the primary element, and the value of the elastic deformation coefficient of the elastic deformation member.

11. The control device of the power transmission device according to claim 9, wherein the specific time constant is a time constant calculated as a value proportional to an inverse value of a square root of a value of the elastic deformation coefficient, from the first permissible limit value, the permissible limit value of the displacement acceleration of the primary element, and the value of the elastic deformation coefficient of the elastic deformation member.

12. The control device of the power transmission device according to claim 5, wherein the gradient of the switching hyperplane corresponding to the arbitral one representative value among a plurality of the representative values of the elastic deformation coefficient is set, taking a condition that a time constant of convergence of the value of the first variable component to zero on the switching hyperplane defined by the gradient of the switching hyperplane becomes equal to or larger than a specific time constant, the specific time constant being a time constant realized in a case supposing that the value of the first variable component is changed stepwise from zero to the first permissible limit value and also the convergence of the value of the first variable component to zero is performed so that the displacement acceleration of the primary element by the driving force of the actuator becomes the permissible limit value of the displacement acceleration, in a state where the elastic deformation coefficient of the elastic deformation member is maintained to the one representative value, as a constraint condition.

13. The control device of the power transmission device according to claim 12, wherein the specific time constant corresponding to the arbitral one representative value among a plurality of the representative values of the elastic deformation coefficient is a time constant calculated as a value proportional to an inverse value of a square root of the one representative value, from the first permissible limit value, the permissible limit value of the displacement acceleration of the primary element, and the one representative value of the elastic deformation coefficient of the elastic deformation member.

14. The control device of the power transmission device according to claim 12, wherein the switching hyperplane variable setting unit is configured to determine the gradient of the switching hyperplane corresponding to the control value of the actual elastic deformation coefficient of the elastic deformation member, using a predetermined arithmetic expression preliminarily set so as to approximate a relationship between a plurality of the representative values of the elastic deformation member, and the gradient of the switching hyperplane preliminarily set based on the specific response characteristics data according to each of the representative value, and the arithmetic expression is set so that a time constant defined by the gradient of the switching hyperplane determined using the arithmetic expression becomes a value equal to or larger than a value proportional to an inverse value of a square root of the value of the elastic deformation coefficient.

15. The control device of the power transmission device according to claim 1, wherein the control device further comprises an observer which sequentially calculates an estimated value of the first variable component and an estimated value of the second variable component, that are obtained by reducing an influence of disturbance from an observed value of the first variable component calculated from the observed value of the secondary power and the desired value of the secondary power, and an observed value of the second variable component calculated as a temporal change rate of the observed value of the first variable component, and the control input determining unit is configured to calculate the value of the switching function using the estimated value of the first variable component and the estimated value of the second variable component calculated by the observer, in place of the observed value of the first variable component and the observed value of the second variable component, and to sequentially generate the control input by the control processing of the sliding-mode control using the value of the switching function.

16. A method of preliminarily setting parameters used in a control processing of a control device of a power transmission device equipped with a primary element which displaces by a driving power of an actuator, and a secondary element coupled to the primary element via an elastic deformation member capable of deforming elastically, and which is provided so as to relatively displace with respect to the primary element by the elastic deformation of the elastic deformation member, and to receive a power transmission from the primary element via the elastic deformation member, the control device controlling a secondary power as a power applied to the secondary element by the power transmission to a desired value, wherein:

the control device is a device configured to sequentially determine a control input for controlling the driving force of the actuator, with a control processing of a sliding-mode control using a switching function configured taking a deviation between an observed value and the desired value of the secondary power as a first variable component, and a temporal change rate of the deviation as a second variable component, so as to converge the first variable component on a switching hyperplane defined by the switching function to zero;

the parameter is a gradient of the switching hyperplane in a phase plane taking the first variable component and the second variable component as two coordinate axis components;

the method comprises a first step of obtaining a plurality of response characteristics data indicating a trajectory of a transition of a set of a value of the first variable component and a value of the second variable component, by an experiment or a simulation of control processing to converge the first variable component from an arbitral value to zero; and a second step of setting the gradient of the switching hyperplane based on a specific response characteristics data satisfying a predetermined requirement among a plurality of the obtained response characteristics data;

when a line indicating a first set value preliminarily set according to a first permissible limit value, the first permissible limit value being a preliminarily set permissible limit value of a magnitude of the value of the first variable component, between the first permissible limit value and zero, on the phase plane, is defined as a first set value line, and a line indicating a second set value preliminarily set according to a second permissible limit value, the second permissible limit value being a preliminarily set permissible limit value of a magnitude of the value of the second variable component, between the second permissible limit value and zero, on the phase plane, is defined as a second set value line, then the specific response characteristics data satisfying the predetermined requirement is a response characteristics data satisfying a requirement that the magnitude of the value of the first variable component and the magnitude of the value of the second variable component on the trajectory indicated by the specific response characteristics data are equal to or smaller than the first permissible limit value and equal to or smaller than the second permissible limit value, respectively, and that the trajectory intersects with the first set value line or the second set value line; and the second step is a step of setting the gradient of the switching hyperplane so that, among intersections between the trajectory indicated by respective specific response characteristics data and the first set value line or the second set value line on the phase plane, a gradient of a line connecting the intersection and an origin of the phase plane coincides with or is approximate to a gradient of a line connecting an intersection satisfying a condition that it is within a preliminarily set requirement range of the gradient of the switching hyperplane, and the origin of the phase plane.

* * * * *